US010240775B2

(12) United States Patent
Cheng et al.

(10) Patent No.: US 10,240,775 B2
(45) Date of Patent: Mar. 26, 2019

(54) MULTI-OBJECTIVE STEAM TEMPERATURE CONTROL

(71) Applicant: EMERSON PROCESS MANAGEMENT POWER & WATER SOLUTIONS, INC., Pittsburgh, PA (US)

(72) Inventors: Xu Cheng, Pittsburgh, PA (US); Ranjit R. Rao, Gibsonia, PA (US); Richard J. Whalen, Jr., Pittsburgh, PA (US)

(73) Assignee: EMERSON PROCESS MANAGEMENT POWER & WATER SOLUTIONS, INC., Pittsburgh, PA (US)

(*) Notice: Subject to any disclaimer, the term of this patent is extended or adjusted under 35 U.S.C. 154(b) by 413 days.

(21) Appl. No.: 15/223,704

(22) Filed: Jul. 29, 2016

(65) Prior Publication Data

US 2018/0031228 A1   Feb. 1, 2018

(51) Int. Cl.
   *G05D 23/00* (2006.01)
   *F22B 35/08* (2006.01)
   (Continued)

(52) U.S. Cl.
   CPC ............ *F22B 35/08* (2013.01); *G05B 13/048* (2013.01); *G05B 19/042* (2013.01); *G05D 23/00* (2013.01)

(58) Field of Classification Search
   CPC ..... F22B 35/08; G05B 13/048; G05B 19/042; G05B 2219/50333; G05D 23/00
   (Continued)

(56) References Cited

U.S. PATENT DOCUMENTS 3,898,441 A * 8/1975 Davis .................. G06F 11/2038
                                                290/40 R
2010/0222911 A1   9/2010 Castelijns et al.
(Continued)

OTHER PUBLICATIONS

Codrons et al., "LQG control of steam temperature in power plants", Proceedings of 2003 European Control Conference.
(Continued)

*Primary Examiner* — Christopher E. Everett
*Assistant Examiner* — Michael W Choi
(74) *Attorney, Agent, or Firm* — Marshall, Gerstein & Borun LLP

(57) ABSTRACT

A control system for controlling a steam turbine power plant having multiple steam flow paths that converge to a combined steam path controls the final steam temperature of the steam input into the turbine by controlling one or more temperature control devices in each of the steam flow paths. The control system includes a multivariable controller, such as a multi-input/multi-output (MIMO) controller, that produces two control signals that control each of a set of downstream control valves in the split steam flow paths. The controller receives two inputs in the form of measured or calculated process variables including the final steam temperature and the inter-stage temperature difference between the steam being produced in each of the two split steam paths and performs multi-objective control based on these inputs. However, when one of the downstream control valves is placed into a manual mode, the controller shifts to being a single objective controller to control the final steam temperature of the system and to thereby perform better or more optimal control.

49 Claims, 8 Drawing Sheets

(51) Int. Cl.
 *G05B 13/04* (2006.01)
 *G05B 19/042* (2006.01)
(58) Field of Classification Search
 USPC .......................................................... 700/282
 See application file for complete search history.

(56) References Cited

U.S. PATENT DOCUMENTS

2015/0107536 A1* 4/2015 Janvier ................... F01K 13/02
 122/406.1
2015/0114320 A1* 4/2015 Beveridge ................. F22G 5/00
 122/479.1

OTHER PUBLICATIONS

Forrest et al., "LQG self-tuning control of super-heated steam temperature in power generation", IEEE Conf. on Control Applications, Vancouver, Canada (1993).
Heng, "H∞ robust control for a boiler superheated steam temperature system", Electric Machines and Control, vol. 8, No. 4, pp. 319-321, 2004(in Chinese).
Hogg et al., "Generalized Predictive Control of Steam Pressure in a Drum Boiler," IEEE Transactions on Energy Conversion, 5(3):485-492 (1990).
Hogg et al., "Generalized Predictive Steam Temperature Control for Power Plant Systems," ICPST, Beijin, China, pp. 266-270 (1994).
Hua et al., "Research and application of state variable-predictive control in 600MW unit reheater temperature control system," Proceedings of the CSEE, vol. 25, No. 12, pp. 103-107, 2005 (in Chinese).
Lin et al., "Adaptive predictive control for superheated steam temperature based on multiple models switching," Journal of Southeast University (Natural Science Edition), vol. 38, No. 1, pp. 69-74, 2008(in Chinese).
Ma, "Study on superheated steam temperature control based on intelligent PID of fuzzy neural network," Thermal Power Generation, vol. 31, No. 6, pp. 101-103, 2007(in Chinese).
Moelbak et al., "Advanced control of superheater steam temperature—an evaluation based on practical applications", Control Engineering Practice, 7 (1999) 1-10.
Moon et al., "Temperature control of ultra-supercritical once-through boiler-turbine system using multi-input multi-output dynamic matrix control," Journal of Electrical Engineering & Technology, vol. 6, No. 3, pp. 423-430, 2011.
Nakamura et al., "Statistical identification for optimal control of supercritical thermal power plants," Automatica, vol. 7, No. 1, pp. 143-155, 1981.
Nomura et al., "Adaptive optimal control of steam temperature for thermal power plants", IEEE Transactions on Energy Conversion, vol. 4, No. 1, Mar. 1989.
Riggs et al., "Advanced model-based steam temperature control for coal fired boilers", Unknown source.
Wang et al., "Engineering application of superheated steam temperature control strategy for utility boiler based on internal model control principle," Automation of Electric Power Systems, vol. 31, No. 4, pp. 97-100, 2007(in Chinese).
Yuan et al., "Field application of multiple model predictive control for superheat temperature in boilers", Journal of Tsinghua University (Science and Technology), vol. 50, No. 8, pp. 1258-1262, 2010(in Chinese).
Zhu et al., "The main stream temperature control system based on ADRC technology," Computer Simulation, vol. 23, No. 8, pp. 211-214, 2006(in Chinese).
Search Report for Application No. GB1711103.0, dated Jan. 11, 2018.

\* cited by examiner

MULTI-OBJECTIVE STEAM TEMPERATURE CONTROL

TECHNICAL FIELD

This patent relates generally to the control of boiler systems and, more particularly, to the control and optimization of steam generating boiler systems using a multi-objective controller.

BACKGROUND

A variety of industrial as well as non-industrial applications use fuel burning boilers which typically operate to convert chemical energy into thermal energy by burning one of various types of fuels, such as coal, gas, oil, waste material, etc. An exemplary use of fuel burning boilers is in thermal power generators, wherein fuel burning boilers generate steam from water traveling through a number of pipes and tubes within the boiler, and the generated steam is then used to operate one or more steam turbines to generate electricity. The output of a thermal power generator is a function of the amount of heat generated in a boiler, wherein the amount of heat is directly determined by the amount of fuel consumed (e.g., burned) per hour, for example.

In many cases, power generating systems include a boiler which has a furnace that burns or otherwise uses fuel to generate heat which, in turn, is transferred to water flowing through pipes or tubes within various sections of the boiler. A typical steam generating system includes a boiler having a superheater section (having one or more sub-sections) in which steam is produced and is then provided to and used within a first, typically high pressure, steam turbine. While the efficiency of a thermal-based power generator is heavily dependent upon the heat transfer efficiency of the particular furnace/boiler combination used to burn the fuel and transfer the heat to the water flowing within the superheater section and any additional section(s) of the boiler, this efficiency is also dependent on the control technique used to control the temperature of the steam in the superheater section and any additional section (s) of the boiler.

As will be understood, the steam turbines of a power plant are typically run at different operating levels at different times to produce different amounts of electricity based on energy or load demands. For most power plants using steam boilers, the desired steam temperature set points at final superheater outlets of the boilers are kept constant, and it is necessary to maintain steam temperature close to the set points (e.g., within a narrow range) at all load levels. In particular, in the operation of utility (e.g., power generation) boilers, control of steam temperature is critical as it is important that the temperature of the steam exiting a boiler and entering a steam turbine is at an optimally desired temperature. If the steam temperature is too high, the steam may cause damage to the blades of the steam turbine for various metallurgical reasons. On the other hand, if the steam temperature is too low, the steam may contain water particles, which in turn may cause damage to components of the steam turbine over prolonged operation of the steam turbine, as well as to decrease the efficiency of the operation of the turbine. Moreover, variations in steam temperature also cause metal material fatigue, which is a leading cause of tube leaks.

Typically, each section (i.e., the superheater section and any additional sections such as reheater sections) of the boiler contains cascaded heat exchanger sections wherein the steam exiting from one heat exchanger section enters the following heat exchanger section with the temperature of the steam increasing at each heat exchanger section until, ideally, the steam is output to the turbine at the desired steam temperature. For example, some heat exchanger sections include individual primary superheaters that are connected in parallel, and which may in turn be connected in series to a final superheater. In such parallel connected or cascaded arrangements, steam temperature is controlled primarily by controlling the temperature of the water at the output of the first stage of the boiler which is primarily achieved by changing the fuel/air mixture provided to the furnace or by changing the ratio of firing rate to input feedwater provided to the furnace/boiler combination. In once-through boiler systems, in which no drum is used, the firing rate to feedwater ratio input to the system may be used primarily to regulate the steam temperature at the input of the turbines.

While changing the fuel/air ratio and the firing rate to feedwater ratio provided to the furnace/boiler combination operates well to achieve desired control of the steam temperature over time, it is difficult to control short term fluctuations in steam temperature at the various sections of the boiler using only fuel/air mixture control and firing rate to feedwater ratio control. Instead, to perform short term (and secondary) control of steam temperature, in many cases saturated water is sprayed into the steam at a point before the final heat exchanger section located immediately upstream of the turbine. This secondary steam temperature control operation typically occurs at the output of each primary superheater and before the final superheater section of the boiler (or sometimes prior to the final superheater sections located in each flow path). In other cases, burner tilt positions or flue gas dampers may be adjusted to perform secondary control of steam temperature. To effect this operation, temperature sensors are provided along the steam flow path and between the heat exchanger sections to measure the steam temperature at critical points along the flow path, and the measured temperatures are used to regulate the amount of saturated water sprayed into the steam for steam temperature control purposes (or to adjust other control mechanisms such as burner tilt positions and flue gas dampers).

In many circumstances, it is necessary to rely heavily on the spray technique to control the steam temperature as precisely as needed to satisfy the turbine temperature constraints described above. In one example, once-through boiler systems, which provide a continuous flow of water (steam) through a set of pipes within the boiler and do not use a drum to, in effect, average out the temperature of the steam or water exiting the first boiler section, may experience greater fluctuations in steam temperature and thus typically require heavier use of the spray sections to control the steam temperature at the inputs to the turbines. In these systems, the firing rate to feedwater ratio control is typically used, along with superheater spray flow, to regulate the furnace/boiler system. In these and other boiler systems, a distributed control system (DCS) uses cascaded PID (proportional-integral-derivative) controllers to control both the fuel/air mixture provided to the furnace as well as the amount of spraying performed upstream of the turbines.

However, cascaded PID controllers typically respond in a reactionary manner to a difference or error between a set point and an actual value or level of a dependent process variable to be controlled, such as a temperature of steam to be delivered to the turbine. That is, the control response occurs after the dependent process variable has already drifted from its set point. For example, spray valves that are upstream of a turbine are controlled to readjust their spray flow only after the temperature of the steam delivered to the turbine has drifted from its desired target. Needless to say, this reactionary control response coupled with changing boiler operating conditions can result in large temperature swings that cause stress on the boiler system and shorten the lives of tubes, spray control valves, and other components of the system.

Still further, control techniques which rely on multiple or cascaded loops can suffer from cross path interference which can lead to poorly performing control. For example, in cases in which a single variable master controller and a balancing single variable controller are used to perform coordinated control of two flow paths, these controllers are generally tuned separately. As a result, interference between these two coupled loops can cause control performance degradation and may even introduce control instability if the tuning is not performed correctly. Likewise, these control systems do not typically operate well when one of the control valves, such as one of the spray valves in one of the steam paths, is put into a manual mode (meaning that the master controller has no ability to control the position of that spray valve). In these circumstances, the master controller still uses the pre-tuned parameters or internal model (in the case of model based control) to perform control function calculations, even if the process gain (as seen from the master control output) has been reduced by half, because the spray valves in one path of the steam flow are in manual mode and thus do not respond to master control signal changes. This control situation can cause severe control performance degradation.

SUMMARY

A control system and method for controlling a steam generating or steam turbine power plant (or other process plant) having multiple split fluid flow paths that converge to a combined fluid flow path in which temperature or some other process variable is being controlled, includes a multivariable controller, such as a multi-input, multi-output (MIMO) controller, that operates as a single master controller for controlling the temperature or other process variable in each of the split flow paths. In one embodiment, the controller receives indications or measurements of two or more input process variables (controlled variables) that are being controlled and produces two or more output control signals to control the manipulated variables, which may be the positions of a set of control valves in each split flow path. In one example, the input control variables may include the final steam temperature (into the turbine for example) or other process variable in the combined flow path, and the difference between the steam related process variable (e.g., temperature) in two of the split flow paths (e.g., immediately after the sprayers or other control mechanism).

Generally speaking, the multi-variable controller uses or includes a process model that defines the relationship between each manipulated variable (or each control signal used to affect the manipulated variables) and each controlled variable to perform simultaneous control of each of the controlled variables, and thus implements multiple control objectives. This configuration enables better control of the final steam temperature while also balancing inter-stage temperatures within each of the split steam paths in a coordinated manner. Moreover, this system and method reduces or minimizes cross-loop control interactions leading to more stable control of the steam temperature at the input of the steam turbine.

Still further, this system and technique includes a feedback tracking mechanism (using a downstream tracking input signal for example) that indicates when one of the downstream control mechanisms (e.g., spray values) is put in a manual or off-line mode, in which the control mechanism is not responsive to the control signal developed by the multi-variable controller. When this situation occurs, the control system immediately resets a weighting parameter used in the control calculations associated with implementing one of the control objectives, e.g., corresponding to keeping the flow path temperature difference at, for example, zero. In this manner, the multi-variable controller becomes a reduced variable controller, such as a single variable controller, and uses an effectively reduced-order internal model to calculate the next control moves on only the first control objective, e.g., to control the final steam temperature to match an associated set point. This feedback capability enables the control system to respond well (or to control the steam temperature well) in situations in which one of the control mechanisms is placed in manual mode.

In one embodiment, a process control system for controlling a process having two or more split flow paths that converge to form a combined flow path, with one or more control elements disposed in each of the two or more split flow paths for controlling a fluid property within the split flow paths, includes a multivariable controller and a feedback tracking network. The multivariable controller includes a plurality of process variable inputs, each process variable input to receive an indication of a determined controlled process variable, a plurality of set point inputs that define a set point for each of the plurality of controlled process variables, a multiplicity of control outputs, each control output to provide a control signal for use in controlling one of the control elements in one of the split flow paths, and a process model that relates changes in each of the control signals to changes in the controlled process variables. Moreover, the feedback tracking network indicates when one of the control elements in one or more of the split flow paths is in a manual mode in which the control element is not responsive to an associated one of the control signals. In a first mode of operation, when the feedback tracking network indicates that none of the control elements is in the manual mode, the multivariable controller uses each of the determined controlled process variable indications and the set points for each of the controlled process variables to determine the control signals. In a second mode of operation, when the feedback tracking network indicates that at least one of the control elements is in the manual mode, the multivariable controller uses less than all of the determined controlled process variable indications and less than all of the associated set points for the controlled process variables to determine the control signals.

If desired, a first one of the process variable inputs may receive a first process variable indication of a first process variable in the combined flow path and a second process variable input may receive a second process variable indication related to measurements of a second process variable in each of two or more of the split flow paths. In one case, the second process variable indication is related to a difference between the second process variable in each of two of the split flow paths and the set point for the second process variable input may be zero. Likewise, the first and the second process variables may be temperatures.

Still further, the process control system may include a combiner that combines one or more of the control signals with a feed forward control signal to produce an adjusted control signal to be provided to one or more of the control elements in the split flow paths. The process control system may also include a module associated with each of the control elements that enables a user to place a respective control element in the manual mode in which the control element is not responsive to one of the control signals. Still further, the controller may be coupled to the feedback tracking network to receive an indication of which of the control elements is set in the manual mode, and may use the indication of which of the control elements is set in the manual mode to determine which control signal to use to drive the first controlled process variable to the first set point associated with the first controlled process variable.

In some cases, the feedback tracking network may receive an indication of a manual status of each of the control elements within the split flow paths, and may include a logic element that receives the manual status of each of the control elements within the split flow paths and that determines whether any one of the control elements is in the manual mode. The feedback tracking network may also include a switch coupled to the logic element that provides a weighting function to the controller based on the output of the logic element. In some cases, the switch may provide a weighting function of zero to the controller when the output of the logic element indicates that at least one of the control elements is in the manual mode and the switch may provide a weighting function of one to the controller when the output of the logic element indicates that none of the control elements is in the manual mode.

In another embodiment, a method of controlling a process having two or more split flow paths that converge to form a combined flow path, with one or more control elements in each of the two or more split flow paths for controlling a fluid property of fluid within the split flow paths, includes receiving indications of a first and a second controlled process variable, receiving set points for each of the first and second controlled process variables and determining, via a processor, a plurality of control signals, each control signal to be used to control one of the one or more control elements in one of the split flow paths. Still further, the method includes receiving a feedback indication of when the control elements in one or more of the split flow paths is in a manual mode in which the control element is not responsive to an associated one of the control signals. In this case, determining the plurality of control signals includes determining the plurality of control signals in a first mode, in which the feedback indication indicates that none of the control elements is in the manual mode, using each of the received first and second controlled process variable indications and the set points for each of the first and second controlled process variables to determine the control signals. Moreover, determining the plurality of control signals includes determining the plurality of control signals in a second mode, in which the feedback indication indicates that at least one of the control elements is in the manual mode, using only one of the first and second determined controlled process variable indications and only one of the first and second set points for the controlled process variables.

In another embodiment, a process control system for controlling a process having two or more split flow paths that converge to form a combined flow path, with one or more control elements in each of the two or more split flow paths for controlling a fluid property within the split flow paths, includes a multivariable controller that includes a plurality of controlled variable inputs, which each receives a value of a different controlled variable, and a set point input for each of the plurality of controlled variables associated with the controlled variable inputs. The multivariable controller operates via a processor to simultaneously determine a multiplicity of control signals with each control signal for use in controlling one of the control elements in one of the split flow paths. Here, the multivariable controller determines the values of the multiplicity of control signals to implement two or more objectives, the first objective being to drive a first controlled variable to the set point for the first controlled variable and the second objective being to drive a second controlled variable to the set point for the second controlled variable. Still further, the process control system includes a feedback tracking network that indicates when the control elements in one or more of the split flow paths is in a manual mode in which the control element is not responsive to an associated one of the control signals. Moreover, in a first mode, when the feedback tracking network indicates that none of the control elements is in the manual mode, the multivariable controller determines the control signals to implement both of the first and second objectives and, in a second mode, when the feedback tracking network indicates that at least one of the control elements is in the manual mode, the multivariable controller determines the control signals to implement only one of the first and second objectives.

In yet another embodiment, a method of controlling a process having two or more split flow paths that converge to form a combined flow path and including one or more control elements in each of the two or more split flow paths for controlling a fluid property of fluid within the split flow paths, includes receiving indications of a multiplicity of controlled variables, storing set points for each of the multiplicity of controlled variables and determining, via a processor, a plurality of control signals, each control signal to be used to control one of the one or more control elements in one of the split flow paths. The method further includes determining the values of the multiplicity of control signals to implement a multiplicity of objectives, each objective related to driving an associated one of the controlled variables to the set point for the associated one of the controlled variables. The method also includes receiving a feedback indication of when the control element in one or more of the split flow paths is in a manual mode in which the control element is not responsive to an associated one of the control signals. Moreover, in a first mode when the feedback indication indicates that none of the control elements is in the manual mode, the method determines the plurality of control signals by simultaneously determining values for the control signals that implement all of the multiplicity of objectives and, in a second mode when the feedback indication indicates that at least one of the control elements is in the manual mode, the method determines the plurality of control signals by determining values for the control signals that implement less than all of the multiplicity of objectives.

In yet another embodiment, a process control system for use in controlling a first fluid property of a fluid in a combined flow path of a process having two or more split flow paths that converge to form the combined flow path includes a control element in each of the two or more split flow paths for controlling a particular fluid property within each of the split flow paths, a first sensor element that determines the first fluid property of the fluid in the combined flow path, and a set of second sensor elements that determine a particular fluid property of the fluid within each of the split flow paths. Still further, the process control system includes a multivariable controller coupled to the first sensor element and to the set of second sensor elements to receive values of a first controlled variable and a second controlled variable, wherein the controller also receives (e.g., stores) values of a first set point for the first controlled variable and a second set point for the second controlled variable. The controller also includes a process model that relates changes in each of the control signals to changes in the controlled variables, and uses the process model to simultaneously determine a plurality of control signals for controlling the control elements in the split flow paths based on the received values of the first and second controlled variables and based on the values of the first and second set points. Still further, the control system may include a manual mode block associated with each of the control elements that enables a user to place an associated control element in a manual mode in which the control element is not responsive to an associated one of the control signals, and may further include a feedback tracking network that indicates when the control element in one or more of the split flow paths is in a manual mode. The multivariable controller may operate in a first mode when the feedback tracking network indicates that none of the control elements is in the manual mode to drive both the first controlled variable to the set point for the first controlled variable and the second controlled variable to the set point for the second controlled variable, and may operate in a second mode when the feedback tracking network indicates that at least one of the control elements is in the manual mode to drive the first controlled variable to the set point for the first controlled variable without driving the second controlled variable to the set point for the second controlled variable.

DETAILED DESCRIPTION

Figure 1:
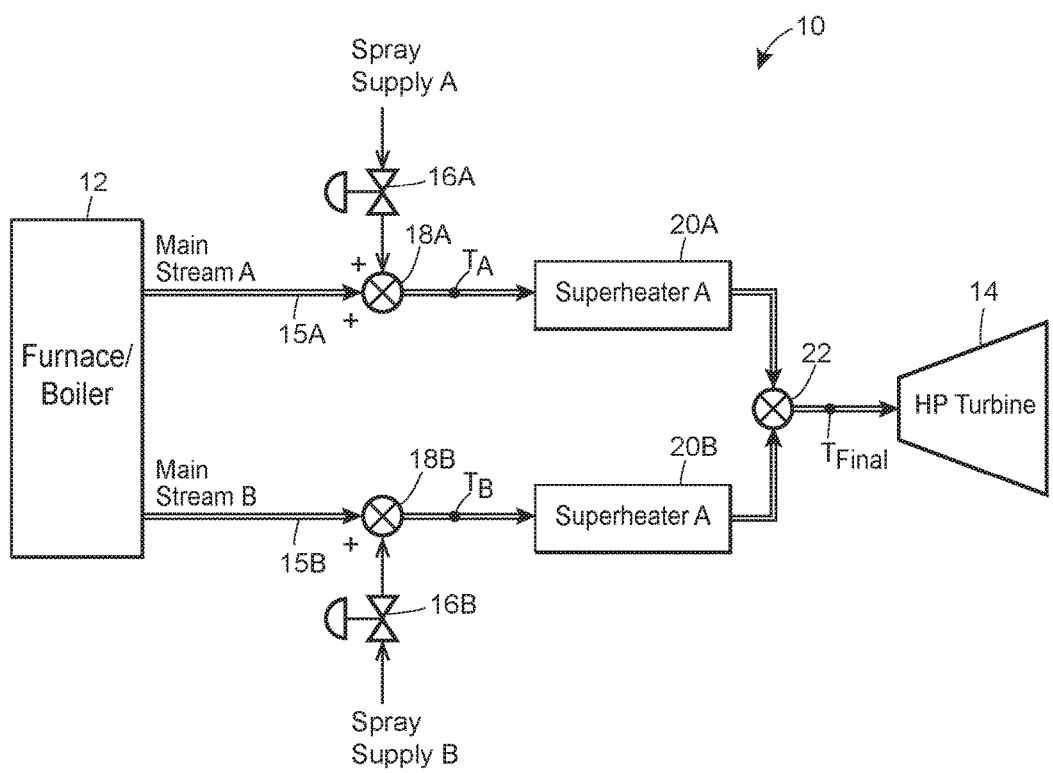
FIG. 1 illustrates a general block diagram of a steam driven turbine system having multiple split steam flow paths that converge into a combined steam flow path with separate spray controllers in each of the split steam flow paths.

FIG. 1 illustrates a generalized diagram of a typical steam flow system 10 used to drive a turbine in, for example, a steam generator power plant. In particular, the system 10 of FIG. 1 includes a furnace/boiler system 12 which produces steam for use in powering a turbine 14. The furnace/boiler system 12 may include a single boiler or multiple boilers which burn fuel to create flue gas, which may contact water vessels to produce steam. As illustrated in FIG. 1, it is typical or common to produce multiple streams of steam in different flow paths 15A and 15B (called split flow paths) coming from the boiler/furnace 12. While two split flows paths 15A and 15B are illustrated in FIG. 1, more split flow paths could be used. The system 10 also includes a spray control system in each of the split flow paths 15A and 15B, with each spray control system including a spray line (e.g., a water line) coupled to a control valve 16A or 16B, with the outputs of the control valves 16A and 16B provided to sprayers located in mixing zones 18A and 18B. The sprayers in the mixing zones 18A and 18B spray water into the steam to cool the steam. Still further, the system 10 of FIG. 1 includes a superheater 20A or 20B in each split flow path 15A or 15B, respectively, which heats the steam out of the mixing zones 18A and 18B, respectively. The superheaters 20A and 20B could instead be reheaters if desired. The superheaters 20A and 20B may be coupled to sources of heat (flue gas for example) and heat up the steam flowing through the superheaters 20A and 20B. The steam exiting the superheaters 20A and 20B is combined at a mixing zone 22 and is provided through a combined fluid flow path to an input of the turbine 14 to drive the turbine 14 to, for example, generate electrical energy or power.

As noted above, steam temperature control is an important part of the steam generation process, as precise control of the steam temperature at the input of the turbine 14 can help to improve the thermal efficiency of the steam turbine 14, and steam temperature control at the inputs of the superheaters 20A and 20B can help to reduce material fatigue in the turbine 14 as well as in boiler tubes, etc. within the superheaters 20A and 20B. It is typical, for example, to control the temperature of the steam entering the turbine 14 to match a set point before this steam is directed into the turbine steam inlet. There are several different ways of controlling steam temperature including the use of spray water (drafted from main feed-water lines for example), as illustrated in FIG. 1, using flue gas by-pass dampers in the furnace (not shown in FIG. 1), using burner tilt positioning in the furnace or boiler (not shown in FIG. 1), etc. As illustrated in FIG. 1, the spray control system includes a spray control apparatus in each of two separate or split steam paths, wherein the two split steam paths merge together in a combined path to form final steam before being injected into the steam turbine 14. While FIG. 1 illustrates a single-stage spray control system in each flow path 15A and 15B, it is possible to use multi-stage spray controls (usually seen in once-through boilers) as well.

Generally speaking, the spray valves 16A and 16B are connected to a controller or a control system (not shown in FIG. 1) that controls the position of the valves to control the amount of water flow through the valves 16A and 16B and thus the amount of cooling spray water provided to the steam in the mixing zones 18A and 18B. The controller generally operates to control the temperatures $T_A$ and $T_B$ of the steam after the mixing zones 18A and 18B (at the inlets of the superheaters 20A and 20B) based on the positioning of the valves 16A and 16B. Moreover, the controller controls the final temperature $T_{Final}$ of the steam at the input of the turbine 14 to perform steam temperature control in one of various manners, which will be described in more detail herein. Typically, the temperatures $T_A$, $T_B$, and $T_{Final}$ are measured by temperature sensors (not explicitly shown in FIG. 1) disposed in or near the flow paths and provided to the controller for use in performing steam temperature control.

Figure 2:
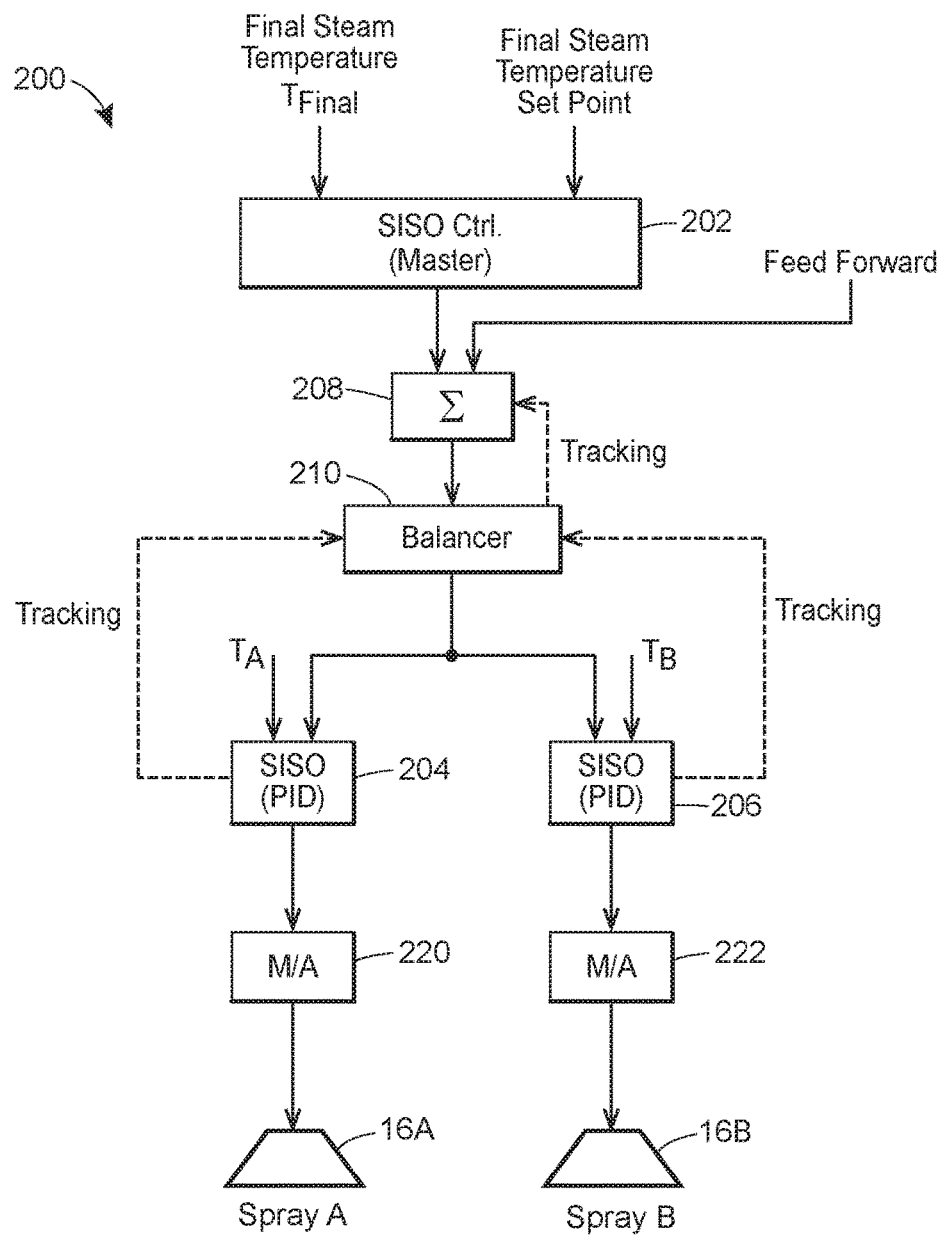
FIG. 2 illustrates a schematic diagram of a prior art manner of controlling a superheater section of a boiler steam cycle for a steam powered turbine, such as that of FIG. 1, using cascaded single variable controllers.

FIG. 2 illustrates a prior art or known control technique 200 that is typically used in, for example, controlling the spray valves 16A and 16B of FIG. 1 to perform steam temperature control of the final steam temperature $T_{Final}$. In particular, the control scheme 200 of FIG. 2 uses a set of cascaded controllers including a master controller 202 and two secondary or cascaded controllers 204 and 206 to perform control of the temperatures $T_A$, $T_B$, and $T_{Final}$ in FIG. 1. The master controller 202 is typically a single variable controller, e.g., a single-input/single-output (SISO) controller such as a proportional-integral-derivative (PID) controller, a PD controller, a PI controller, a lead-lag transfer function based controller, a model predictive controller, a linear quadratic Gaussian controller, a pole-placement based controller, etc., or some other type of single variable controller. Moreover, the master controller 202 operates to control the final steam temperature $T_{Final}$ of FIG. 1 to match an operator provided set point provided at an input of the controller 202. The output of the controller 202 is provided to a summing block 208, which receives a feed-forward signal, which may be, for example, a signal based on or derived from the boiler load demand, etc., and which sums this feed forward signal to the output of the controller 202 to produce a set point used to control the controllers 204 and 206. Generally speaking, the summer 208 enables feed forward control to be incorporated into the control of the spray valves 16A and 16B. The output of the summer 208 is provided to a balancing unit or balancer 210, which produces a set-point signal for each of the controllers 204 and 206, to be used in performing control of the individual sprays valves 16A and 16B (also called spray A and spray B.) More particularly, if all of the downstream algorithms (blocks) are requesting the upstream algorithm to track, then the output of the balancer 210 is one of the highest, the lowest, or the average of the analog track signals passed back from the downstream algorithms or blocks. If any of the downstream algorithms are not requesting the upstream algorithm to track, then the output of the balancer 210 can have several options (which may be user definable). In one option, the output is simply the gained and biased analog input value. In particular, if the gain equals one and the bias equals zero, then the output equals the input. In another option, the output of the balancer 210 is a value which causes the average of all the downstream algorithm outputs to be equal to the gained and biased input value into the balancer 210.

In any event, the balancer 210 provides set points as inputs to the cascaded controllers 204 and 206, which may be, for example, single variable controllers, such as PID controllers or other types of single-input/single-output (SISO) controllers including, for example, lead-lag transfer function based controllers, model predictive controllers, linear quadratic Gaussian controllers, pole-placement based controllers, etc. Moreover, the controllers 204 and 206 receive measurements of the temperatures $T_A$ and $T_B$, respectively, in order to perform PID control to drive the temperatures $T_A$ and $T_B$ to the set points provided by the balancer 210. The output of the controllers 204 and 206 are control signals that are then provided through a manual/automatic (M/A) block 220 or 222, which enable a user or an operator to put the spray valves 16A and 16B into a manual mode. Generally, the manual/automatic (M/A) blocks 220 and 222 each provide a control signal to an associated one of the valves 16A and 16B to thereby drive the valves 16A and 16B to deliver controlled amounts of spray into the mixing zones 18A and 18B, respectively, to thereby control the temperatures $T_A$ and $T_B$. More particularly, the manual/automatic (M/A) blocks 220 and 222 enable a user or operator or other user to set each of the control elements (spray valves in this case) in an automatic mode in which the output of the cascaded controllers 204 or 206 is provided to the control valves 16A and 16B or, alternatively, to a manual mode, in which the blocks 220 or 222 provide a control signal that is manually provided by or set by the user, to the spray valves 16A or 16B.

The PID controllers 204 and 206 and/or the M/A block 220 and 222 may provide tracking signals back to the balancer unit 210 and/or to the summer 208 to indicate whether the control elements are tracking the output of the controllers 204 or 206 (i.e., indicating whether the M/A blocks 220 and/or 222 are in an automatic mode setting) or instead whether the control elements are in a manual mode in which the output of the controllers 204 or 206 are not used to control the positions of the spray valves 16A or 16B.

In various instances, the balancer 210 may implement different algorithms for controlling or providing the balanced set point to the PID controllers 204 and 206, based on whether one or more of the spray valves 16A and 16B is set into the manual mode. In particular, when a control valve 16A and 16B is set in the manual mode, the controller 202 has no ability to actually control the position of that valve, and thus the balancer 210 may compensate or attempt to compensate by providing a differently weighted set point to the other controller 204 and 206 which is still able to perform control of one of the valves 16A and 16B. The specific operation of the balancer 210 will not be described in detail, other than to note that the operation of the balancer 210 attempts to compensate for or provide better control in some manner when one of the spray valves 16A and 16B is set in a manual mode. Needless to say, however, the balancer 210 operates on the output of the master controller 202 as provided to the summer 208, and the master controller 202 has no ability to control optimally when one of the spray valves 16A or 16B is in a manual mode. As a result, while the balancer 210 attempts to compensate for situations in which one of the spray valves 16A or 16B is controlled in a manual mode, the balancer 210 cannot optimize control of the final temperature $T_{Final}$ in that situation.

Generally speaking, cascaded control systems, such as the control system 200 of FIG. 2, performs sluggishly or has an overall slower response due to fact that the control signals provided to the spray valves 16A and 16B are generated through two controllers connected in series with one another. Still further, the methodology of compensating control based on the tracking signals in the system of FIG. 2, that is, performing control compensation when it is known that one of the spray valves 16A or 16B is set in a manual mode, is not optimal, because the master controller 202 is tuned with the assumption that both of the cascaded or secondary controllers 204 and 206 are operating to perform control. Thus, optimal control is only possible when all three of these controllers are performing control. When one of the cascaded controllers 204 or 206 is no longer able to be used because the corresponding M/A block 220 or 222 is set in a manual mode, control as provided by the control system 200 of FIG. 2 is no longer optimal and may be sluggish.

Figure 3:
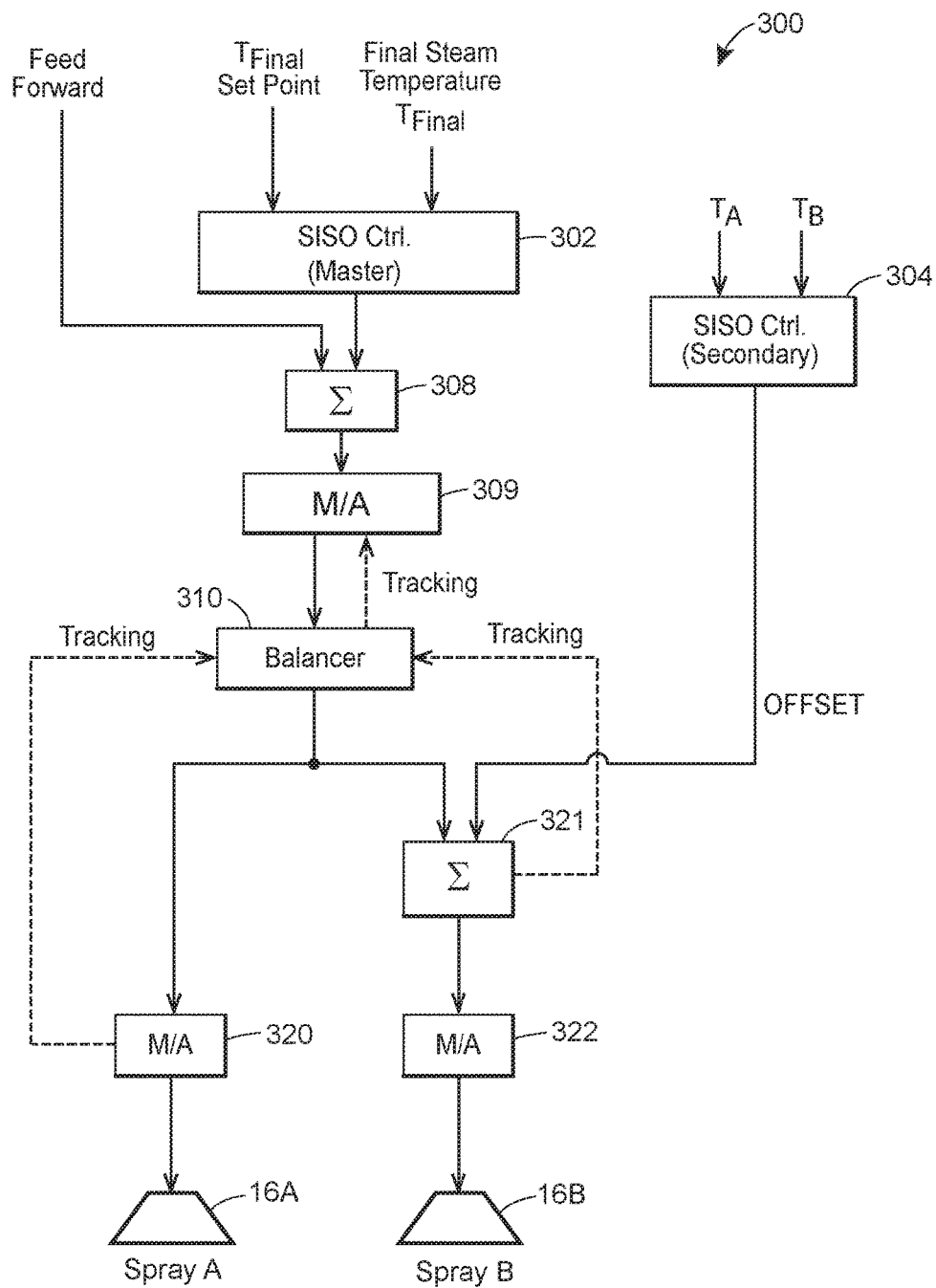
FIG. 3 illustrates a schematic diagram of a prior art manner of controlling a superheater section of a boiler steam cycle for a steam powered turbine, such as that of FIG. 1, using two single variable controllers with offset compensation.

FIG. 3 illustrates another known control scheme used to control a split-stream spray system such as that of FIG. 1. In particular, the control scheme of FIG. 3 includes a master controller 302 and a secondary controller 304. In this case, however, the secondary controller 304 is not cascaded to the master controller, but instead performs control based on a separate control variable (being the difference between the measured temperatures $T_A$ and $T_B$) to produce an offset control variable or offset control signal used in controlling one of the sprayers, in this case sprayer 16B.

In particular, the master controller 302, which may be, for example, a single variable controller or a single-input/single-output controller, such as a PID controller, a PI controller, a PD controller, any multi-input/multi-output controller used in a single input/single-output manner, etc., receives a set point for the final steam temperature $T_{Final}$ and a measurement of final steam temperature $T_{Final}$ of FIG. 1, and performs single variable control to produce a control signal for controlling both of the control valves 16A and 16B in a manner that drives the final steam temperature $T_{Final}$ to its associated set point. The output of the master SISO controller 302 is provided to summer block 308, which allows for control compensation based on a feed forward signal, which may be, for example, dependent on load demand or which may be some other known feed forward signal that affects control. The output of the summer 308 is a control signal that is provided through a manual/automatic mode control block 309, which enables the user to set the entire system in a manual mode or an automatic mode. When the block 309 is set in an automatic mode, the block 309 provides the control signal to a balancer 310. Generally speaking, the balancer 310 operates to produce balanced control signals provided to the control valves 16A and 16B based on the number of spray valves 16A and 16B that are in automatic mode operation at the time, and provides these balanced control signal(s) to each of the spray lines of the control system.

As illustrated in FIG. 3, one of the balanced control signals is provided to an M/A block 320, the output of which is used to control the spray valve 16A, and the other balanced control signal from the balancer 310 is provided to a summer 321 which sums this signal with the offset control signal produced by the secondary controller 304 to produce an offset compensated control signal. The output of summer 321 is provided to an M/A block 322, the output of which is used to control the spray valve 16B.

Thus, in this case, the master controller 302 produces a control signal that is provided indirectly to each of the control valves 16A and 16B to control the final steam temperature $T_{Final}$. However, in order to drive the temperatures $T_A$ and $T_B$ at the input of the superheaters 20A and 20B of FIG. 1 to be the same as each other, the secondary controller 304 operates to receive both the measured temperatures $T_A$ and $T_B$ and provides an offset control signal to the summer 321 which drives the spray valve 16B to make the temperature $T_B$ match the temperature $T_A$. In this case, the secondary controller 304, which may be, for example, a PID controller or any other type of single-input/single-output or single variable controller, produces an offset control signal based on the difference between the temperatures $T_A$ and $T_B$ in order to drive one of the control valves, in this case control valve 16B, to compensate for or to reduce a non-zero temperature difference in the split flow paths. Thus, the control scheme of FIG. 3 has a secondary controller 304 that is configured to control one of the spray valves 16B to drive the temperature controlled by the spray valve 16B (i.e., the temperature $T_B$) to be equal to temperature $T_A$, while the master controller 302 controls both of the spray valves 16A and 16B to drive the final output temperature $T_{Final}$ to be equal to the final temperature set point.

Similar to the control system of FIG. 2, the M/A blocks 320 and 322 provide tracking signals back to the balancer 310, which may use these signals to understand or perform different types of balancing based on whether one of the blocks M/A 320 or 322 is in a manual mode. The balancer 310 operates in these situations to compensate for control of the final temperature $T_{Final}$ based on the fact that the master controller 302 is no longer able to control one of the spray valves 16A or 16B. A more detailed operation or description of a control system such as that of FIG. 3 is provided in U.S. patent application Ser. No. 14/066,186, which published as U.S. Patent Application Publication No. 2015/0114320.

Again, however, the control scheme of FIG. 3 includes various inherent problems that can lead to sub-optimal control in certain circumstances. In particular, the system of FIG. 3 includes two separate controllers 302 and 304 which operate independently, but which operate to control at least one common element, i.e., the sprayer 16B of FIG. 1. As a result, the master controller 302 and the secondary controller 304 need to be tuned carefully. If these controllers are not tuned properly, they may act adversely to each other, thereby causing interruptions in control performance. Moreover, in the control scheme of FIG. 3, when the spray valve 16A is set into a manual mode by the manual M/A block 320, both the master controller 302 and the secondary controller 304 are attempting to control a single control valve 16B to meet two different objectives. In particular, the master controller 302 is trying to control the valve 16B to control the final output temperature $T_{Final}$, while the secondary controller 304 is trying to control the spray valve 16B to control the difference between temperatures $T_A$ and $T_B$. This multi-objective control, based on the operation of a single control valve 16B, is fraught with difficulty and complications, as in reality, neither objective can be matched optimally. This type of control may therefore lead to crosstalk or instability in the control loop.

Figure 4:
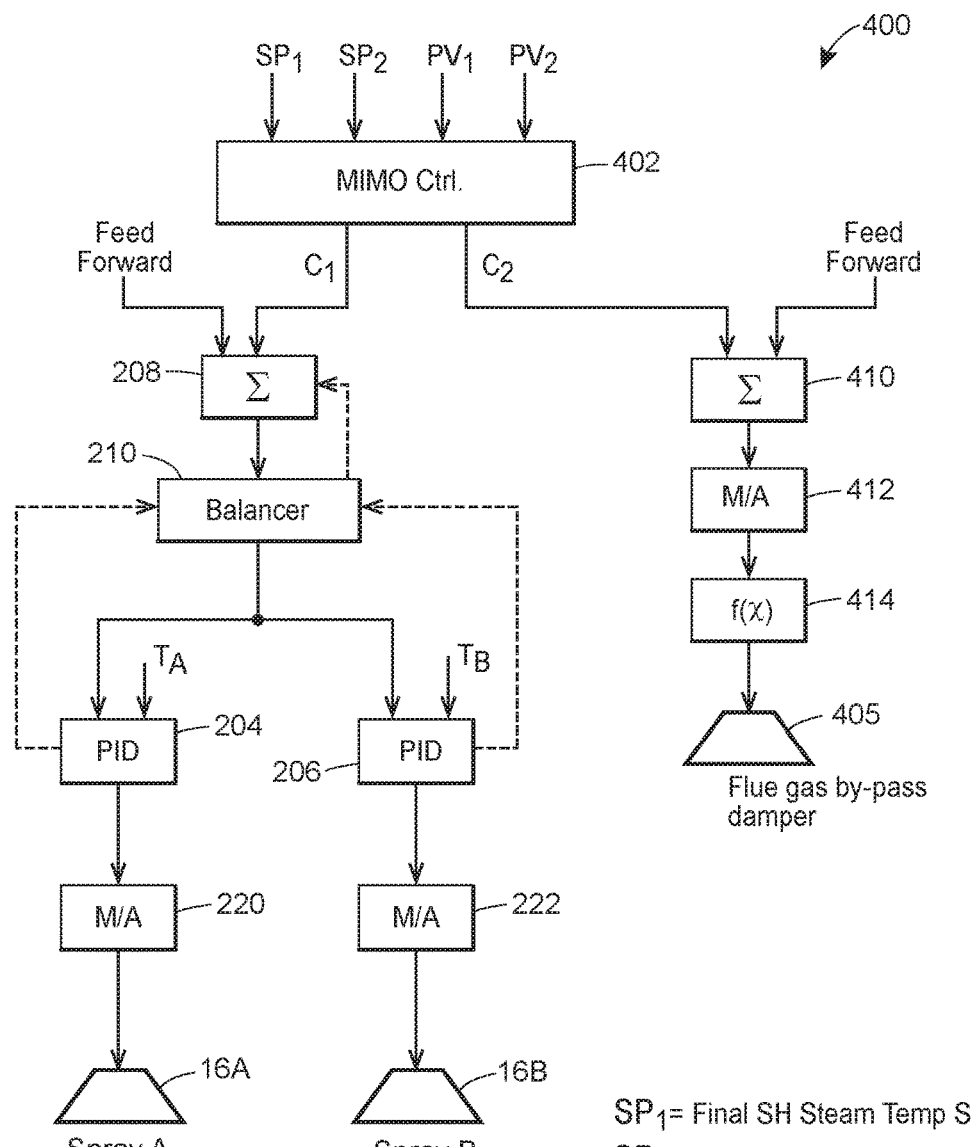
FIG. 4 illustrates a schematic diagram of a prior art manner of controlling a superheater section of a boiler steam cycle for a steam powered turbine, such as that of FIG. 1, in addition to controlling an air damper using a multivariable controller.

While FIGS. 2 and 3 illustrate the use of multiple single variable controllers, FIG. 4 illustrates a typical known system or configuration 400 that uses a multivariable controller to control steam temperature at the input of a turbine in a split stream steam turbine system. However, unlike the control systems of FIGS. 2 and 3, the multivariable controller of FIG. 4 performs coordinated control of multiple different types of control mechanisms in a split steam flow path generator system, including spray valves and boiler damper positions for example. In this case, the system 400 of FIG. 4 includes a master controller 404, in the form of a multiple-input/multiple-output controller, that receives two process variables $PV_1$ and $PV_2$ as well as two set points for those process variables. In this case, the multivariable controller 402 is actually controlling different types of control mechanisms that may be used to change the steam temperature in different manners, such as controlling the spray valves 16A and 16B of FIG. 1 and controlling the positions of flue gas bypass dampers located in the furnace section 12 or the superheater sections 20A and 20B of FIG. 1 (but not explicitly shown in FIG. 1).

As illustrated in FIG. 4, the controller 402 produces a first control output $C_1$ which is provided to a control system that is essentially the same as the control system illustrated in FIG. 2, which operates in the same manner as described in FIG. 2 (using cascaded control) to control the spray valves 16A and 16B. Likewise, the controller 402 produces a second control output $C_2$ which is provided to a second control system associated with control of a flue gas bypass damper system. The second control system includes a summer 410, which sums to the control signal $C_2$ with a feed forward control signal to enable feed forward control compensation. If desired, the output of the summer 410 is provided to an M/A block 412, which enables the user to put the flue gas bypass damper system into a manual mode versus an automatic mode. The output of the M/A block 412 is then provided to a linearization function block 414, which determines the control movements of the flue gas bypass dampers 405 to control positioning of the bypass dampers so as to control the amount of the hot gas that is sent to each of the furnace sections or through each of the various sections of the superheaters 20A and 20B of FIG. 1. The control scheme of FIG. 4 is provided merely to illustrate that it is known to use multivariable control in a steam control system to control two different types of control elements or control phenomena, such as spraying water, in the one case, and positioning flue gas bypass dampers, in the second case. The multiple control outputs of the multivariable controller 402 of FIG. 4 are not used to control the same type of control mechanism, such as two spray valves.

Figure 5:
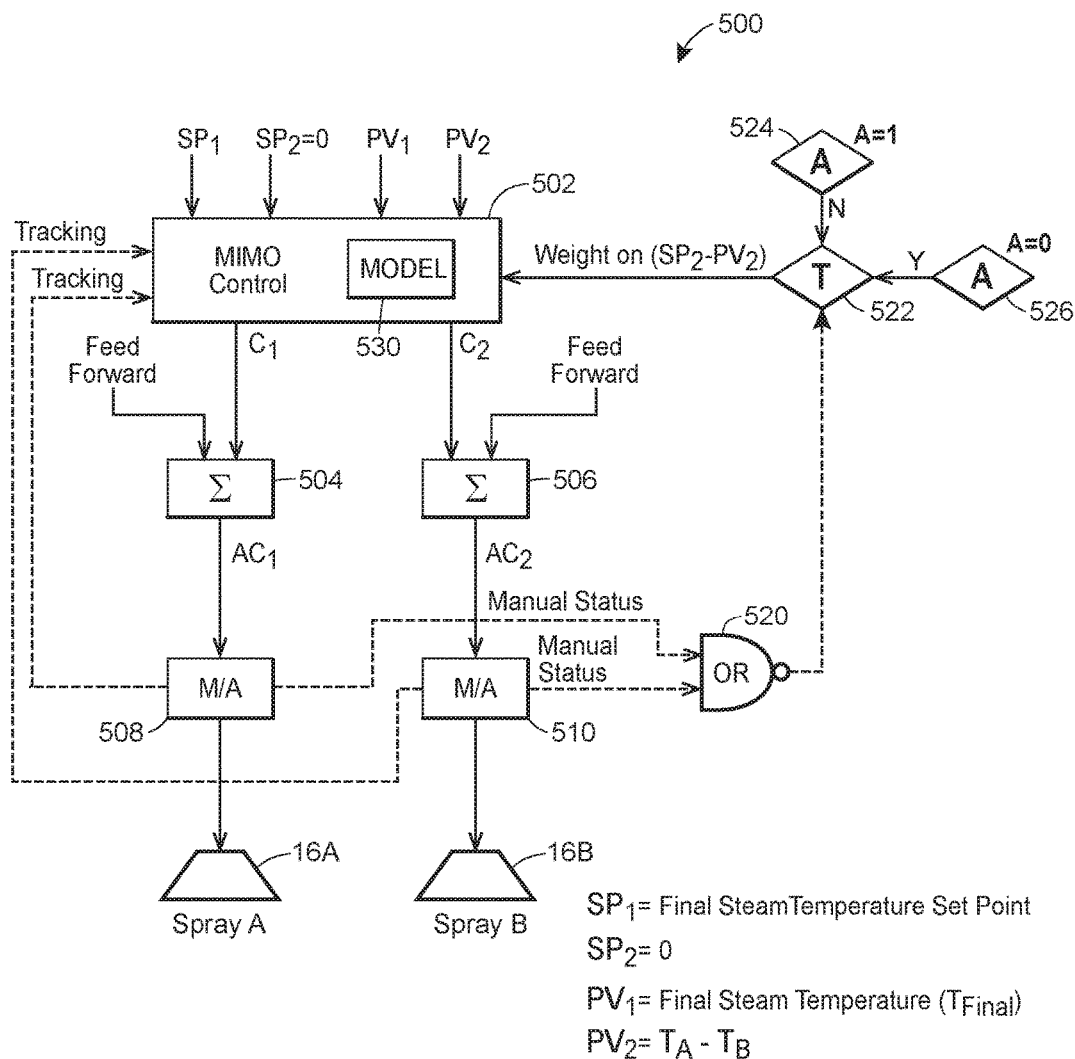
FIG. 5 illustrates a schematic diagram of a manner of controlling the boiler steam cycle of the superheater section of FIG. 1 using a multivariable controller coupled to each of the set of spray control valves in the split flow paths.

FIG. 5 illustrates a new control system 500 and technique that uses a multivariable controller to perform control of the same type of control elements in different paths of a split flow stream system, and that may be used to control the system of, for example, FIG. 1, in a more optimal manner, especially when one of the spray valves 16A or 16B is put into a manual control mode or other non-automatic mode. In particular, the system 500 of FIG. 5 includes a multivariable controller 502 that performs multivariable control on at least two process variables to perform control of both spray lines, i.e., the spray valves 16A and 16B of FIG. 1, of a split stream steam generation system, in a more optimal manner than the prior art technology discussed previously. In particular, the controller 502 receives multiple inputs in the form of process variables $PV_1$ and $PV_2$ and set points $SP_1$ and $SP_2$, and performs simultaneous multivariable control to produce two control outputs or control signals $C_1$ and $C_2$ that operate to drive the proves variables $PV_1$ and $PV_2$ to their associated set points $SP_1$ and $SP_2$.

Generally speaking, the controller 502 may be any type of multivariable controller, such as model predictive controller (MPC), a neural network controller, a first-principles controller, a linear quadratic Gaussian controller, a pole-placement based controller, any MIMO controller designed in the frequency domain (e.g., using an inverse Nyquist array method), etc., that operates using multiple inputs to produce multiple control signals for controlling plant equipment. As indicated in FIG. 5, the control signals $C_1$ and $C_2$ are provided to summers 504 and 506, respectively, wherein the summers 504 and 506 enable feed forward signals, such as signals generated based on load-demand signals, etc., to be summed to the control signals $C_1$ and $C_2$ to produce adjusted control signals $AC_1$ and $AC_2$, each having a feed forward control component. Of course, use of the summers 504 and 506 or other elements to incorporate feed forward control is not necessary, and these elements may be left out of the system 500 if desired. In any event, the adjusted control signals $AC_1$ and $AC_2$ are provided through manual/automatic (M/A) mode blocks or elements 508 and 510, respectively, to control the spray valves 16A and 16B when the blocks 508 and 510 are set in an automatic mode. Of course, it will be understood that the spray valves 16A and 16B could be any other control mechanisms, such as other types of control valves, burners, dampers, etc., which might be used in various different types of control systems to control a process variable such as steam temperature. Of course, when the manual/automatic control blocks 508 and 510 are set in a manual mode or some other non-automatic mode, the blocks 508 and/or 510 provide a user-provided control signal or some other control signal to the spray valves 16A and/or 16B, in which case, control of the spray valves 16A and/or 16B is not affected by changes in the control signals $C_1$ and $C_2$ from the controller 502.

Still further, as indicated in FIG. 5, the control system 500 includes a feedback tracking network that uses tracking signals and/or manual status signals provided by the M/A block 508 and 510 to indicate when one or both of the M/A blocks 508 and 510 is set in a manual mode or some other non-automatic mode (that is, whenever the adjusted control signals $AC_1$ and/or $AC_2$ are not being provided to control the spray valves 16A and/or 16B). In the case specifically illustrated in FIG. 5, tracking signals from the blocks 508 and 510 are sent to the controller 502 to indicate when either or both of the M/A blocks 508 and 510 is/are set in a manual mode, and a manual status signal is provided from each of the blocks 508 and 510 to an OR logic gate or logic element 520, with each of the manual status signals being a logical one ("1") when the associated block 508 or 510 is set in a manual mode or other non-automatic mode and a logical zero ("0") when the associated block 508 or 510 is set in an automatic mode. The OR gate 520 thus operates to produce a high, true, or logic one ("1") signal when either or when both of the manual status signals from the M/A blocks 508 and 510 is set to one or high or true. Thus, the output of the OR gate 520 is high or true when at least one of the blocks 508 and 510 is set in a manual or other non-automatic mode.

Moreover, the feedback tracking network of the system 500 includes a switch 522 coupled to signal blocks 524 and 526, which provide different analog or digital signals to inputs of the switch 522. The switch 522 operates to provide one of the signals from one of the block 524 or 526 to the controller 502 which the controller 502 uses to weight one of the control variables or other control calculations used in the controller 502 to generate the control signal $C_1$ and $C_2$. Generally speaking, the blocks 524 and 526 provide analog signals in the form of a unit signal (one) and a null signal (zero) to the inputs of the switch 522. However, the blocks 524 and 526 could provide digital signals to the switch 522 instead, with the digital signals being a logic one and a logic zero, or some other value if so desired. During operation, the switch 522 operates based on the value of the logic signal from the OR gate 520 to provide a weighting factor or a weighting function that is used by the controller 502 to perform better control in situations in which one or both of the M/A blocks 508 and 510 is in a manual or other non-automatic mode. Generally speaking, when the switch 522 receives a high or logical one (true) signal from the OR gate 520 (indicating that one or both of the spray valves 16A and 16B is in the manual mode), the switch 522 provides the signal from the block 526, which is zero in this case, as the weighting factor to the controller 502. Alternatively, when the output of the OR gate 520 is low or a logic zero (false), indicating that neither of the M/A blocks 508 nor 510 is in a manual mode, the switch 522 provides the signal from the block 524, which is a one in this case, to be applied by the controller 502 as a weighting factor in the control scheme used by the controller 502. Of course, while FIG. 5 depicts one specific implementation of a feedback tracking network, any other type of feedback tracking network, or other components could be used to create a feedback tracking network, that informs the controller of when one or more of the control elements is in a manual mode to thereby enable the controller to compensate for this reduced control freedom scenario.

As will be understood, the controller 502 controls two process variables received at inputs of the controller 502, with the first process variable $PV_1$ being the final steam temperature ($T_{Final}$ in FIG. 1) and with the second process variable $PV_2$ being the difference between the temperature $T_A$ and the temperature $T_B$ (i.e., $T_A-T_B$) at the output of the mixing zones 18A and 18B of FIG. 1 in the split flow paths. Generally speaking, the controller 502 includes a process model 530 that models the effect of changes in each of the control signals $C_1$ and $C_2$, and ultimately $AC_1$ and $AC_2$, on each of the process variables $PV_1$ and $PV_2$, which in this case are representative of the final steam temperature $T_{Final}$ and the difference between the temperatures $T_A$ and $T_B$. Moreover, as illustrated in FIG. 5, the controller 502 receives two set points in the form of $SP_1$ and $SP_2$, with the set point $SP_1$ being the desired value of the final steam temperature $T_{Final}$ of FIG. 1 and with the set point $SP_2$, being the desired value of the difference between the process variable being directly controlled by the spray values 16A and 16B or by the control signals $CV_1$ and $CV_2$. In the scenario of FIG. 5, the set point $SP_2$ is generally set to zero (indicating that it is desirable to drive the temperatures $T_A$ and $T_B$ to be the same temperature), although this setting need not be the case in all instances, so that the set point $SP_2$ could be some other value if desired. In any event, the controller 502 uses the process variable inputs $PV_1$ and $PV_2$, the set points for the process variable inputs $SP_1$ and $SP_2$, and the process model 530 to implement two control objectives, namely driving $PV_1$ to $SP_1$ and driving $PV_2$ to $SP_2$.

More particularly, the multivariable controller 502 performs simultaneous multivariable control based on its internal model 530 to provide optimal simultaneous control that implements both objectives when the controller 502 is able to control both spray valves 16A and 16B, i.e., when both of the sprays lines or valves 16A and 16B are in an automatic mode. Thus, when both of the valves 16A and 16B are in an automatic mode, the multivariable controller 502 implements control with two objectives. The first objective is to drive the final steam temperature $T_{Final}$ to desired set point $SP_1$, and the second objective is to drive the measured temperature $T_A$ and measured temperature $T_B$ so as to cause the difference between these temperatures to match the set point $SP_2$, which in this case is set to zero.

Of course, the multivariable controller 502 may include or use a process model, such as a MPC model, a first principles model, or some other model, that generally defines the reaction or change in one of the controlled variables ($PV_1$ or $PV_2$) to a change in one of the manipulated variables, i.e., the control signals $C_1$ or $C_2$. The use of this model 530 enables the multivariable controller 502 to determine which values for the control signals $C_1$ and $C_2$ will drive the system to meet both objectives in an optimal manner.

However, when one of the control valves 16A or 16B is put into a manual mode or some other non-automatic mode in which the control valve 16A or 16B is not being controlled by one of the control signals $C_1$ or $C_2$, the feedback tracking network of FIG. 5 operates to essentially change the multivariable controller 502 into a single variable controller by applying a weighting factor of zero to the control components or control calculations associated with meeting the second objective, i.e., driving the process variable $PV_2$ to match the set point $SP_2$. In one particular case, the second objective is to drive the difference between the measured temperatures $T_A$ and $T_B$ to zero. More particularly, when one of the M/A blocks 508 and 510 is set in a manual mode, the output of the OR gate 520 will be high or a logical one, which causes the switch 522 to send the signal from the block 526 (which is a zero or null signal) as the weighting factor to be applied to the control calculations associated with implementing the second objective (i.e., forcing the difference between $PV_2$ and $SP_2$ to zero). This zero waiting factor thereby cancels out, within the controller 502, the calculations that force the control signals C1 and C2 to meet the second objective, leaving only the first objective. Thus, in this case, control is only performed on the difference between the final steam temperature $T_{Final}$ and the set point for the final steam temperature $SP_1$. Again, in this case, the controller 502 effectively becomes a single-input/single-output or single variable controller in which the input feedback signal measured in the process is the final temperature $T_{Final}$ and only one of the control valves 16A or 16B is used to control this temperature. However, in this case, the process model 530 defines or models the effect of changing one of the control valves 16A and 16B (whichever one is in automatic operation) on the final steam temperature $T_{Final}$, and thus the controller 502 can perform optimal control under these control constraints. Moreover, it will be understood the controller 502 uses the tracking signals to know which control valve 16A or 16B is in the automatic mode and thus which control signal $C_1$ or $C_2$ to use to control the final steam temperature $T_{Final}$ in this reduced-order control scenario. Thus, the tracking signals provided from the blocks 508 and 510 to the controller 502 may be used by the controller 502 to determine which control signal $C_1$ or $C_2$ to use to control the final steam temperature $T_{Final}$ in this reduced objective case. However, when both of the spray valves 16A and 16B are in the automatic mode, the weighing factor provided by the feedback tracking network is a one, which causes the controller 502 to operate as a multivariable controller implementing multiple objective control. That is, the feedback tracking network causes the controller 502 to operate to implement as many objectives as there are degrees of control freedom. For example, with two of the control valves 16A and 16B in automatic control, there are two degrees of control freedom, which enables the controller 502 to implement two objectives (associated with $PV_1$ and $PV_2$). However, when one of the control valves 16A or 16B is in a manual mode, the controller 502 only has one degree of control freedom (one manipulated variable to use to perform control), and the feedback tracking network causes the controller 502 to operate as a single variable controller, implementing only one control objective (associated with $PV_1$).

It will be noted that, while the system of FIG. 5 indicates that the feedback tracking network provides a weighting function in the form of a number between zero and one to the controller 502 for use in applying to certain control calculations in the controller 502, the use of a weighting function may be implemented in other manners and is intended to cover any method of reducing or eliminating the implementation of one of the objectives in the controller 502, no matter how this operation is actually implemented in the controller calculations (e.g., by using a different process model, by using a different control routine that does not perform any calculations for the second or dropped objective, etc.). Still further, while FIG. 5 indicates that the controller 502 receives indications of the second process variable $PV_2$ directly as a difference between the temperatures $T_A$ and $T_B$, the controller 502 could also receive indications of the second process variable $PV_2$ by receiving measurements or other indications of the temperatures $T_A$ and $T_B$ directly and then calculating the difference between these received temperatures.

Importantly, the control system of FIG. 5 eliminates or reduces the disadvantages discussed above with respect to the other control scenarios of FIGS. 2-4. In particular, the control scheme of FIG. 5 uses a single controller and thus is not subject to the delay or sluggish response problems associated with using a set of cascaded controllers, such as those of FIGS. 2 and 4. Moreover, because there is a single controller within the control scheme of FIG. 5, the control system of FIG. 5 does not need to assure tuning matching between separate controllers, as is the situation in the control schemes of FIGS. 2 and 3. Likewise, because the feedback system of the control system of FIG. 5 eliminates control of the secondary controlled variable or objective $PV_2$ when one of the control valves 16A or 16B is put in a manual mode, the control scheme of FIG. 5 is not subject to one or more controllers attempting to drive a single control valve to achieve two or more different objectives. This situation leads to more stable and optimal control in the situation in which one of the control valves 16A or 16B is put into a manual or other non-automatic mode.

It will be understood that, while the control scheme of FIG. 5 is described respect to controlling two spray valves 16A and 16B disposed in two different steam flow lines of a split stream steam generation system, this control scheme can be used to control temperature or other process variables (e.g., fluid flow, pressure, level, etc.) in other control situations in which control is performed to a process variable in each of two or more separate flow lines or containers that are combined to produce a single stream of fluid in which a process variable is being controlled.

Moreover, the control scheme described with respect to FIG. 5 could be extended to use in controlling a process having more than two split flow lines, such as in a process including three, four, etc. split flow lines that are combined to produce a reduced set of flow lines, such as one, in which a process variable is being controlled. More particularly, the configuration of FIG. 1 could be modified so that there are three steam lines (instead of two), with a spray valve disposed in each steam line and with the three steam lines merging to form a single combined steam line provided to the turbine 14. In this case, the controller 502 (of FIG. 5) could be extended to produce three control signals ($C_1$, $C_2$, and $C_3$) with each control signal controlling one of the three control valves. Moreover, the controller 502 could receive inputs in the form of $PV_1$ (the measured final steam temperature), $PV_2$ (the difference between the temperatures $T_A$ and $T_B$ in the first two steam lines) and $PV_3$ (the difference between the temperatures $T_B$ and $T_C$) in the last two steam lines, for example. The controller 502 could also receive set points in the form of set point $SP_1$ (the desired final steam temperature), set point $SP_2$ (the desired difference between temperatures $T_A$ and $T_B$, which would normally be zero), and set point $SP_3$ (the desired difference between temperatures $T_B$ and $T_C$, which again would normally be zero). The feedback tracking network could also determine when one or two of the spray valves are set in a manual mode and set weighting factors on the second two objectives (i.e., driving the temperature differences between $T_A$ and $T_B$ or between $T_B$ and $T_C$ to zero) depending on which spray valve or spray valves are set in the manual mode. In this manner, the feedback tracking network could reduce the controller 502 from a three objective multivariable controller to a two objective multivariable controller by eliminating one of the second or third objectives when one of the spray valves is set in a manual mode, and the feedback tracking network could reduce the controller 502 to a single variable controller (instead of a multivariable controller) to implement only one objective when two of the spray valves are set in a manual mode by eliminating or weighting out the control calculations associated with both of the second and third objectives.

Still further, while the control scheme of FIG. 5 is illustrated as being used to control steam temperature in a steam turbine system having multiple steam paths or lines, this system could be used in other control scenarios in which different flows of fluid or other material are processed in different control paths or fluid flow paths and are combined to produce a final control path or final fluid before being used in some manner. For example, instead of controlling temperature of steam in several lines, the control system of FIG. 5 could be used to control the flow of fluid, or the pressure fluid, such as gas, in each of various lines, which fluid is then combined in an output line.

Figure 6:
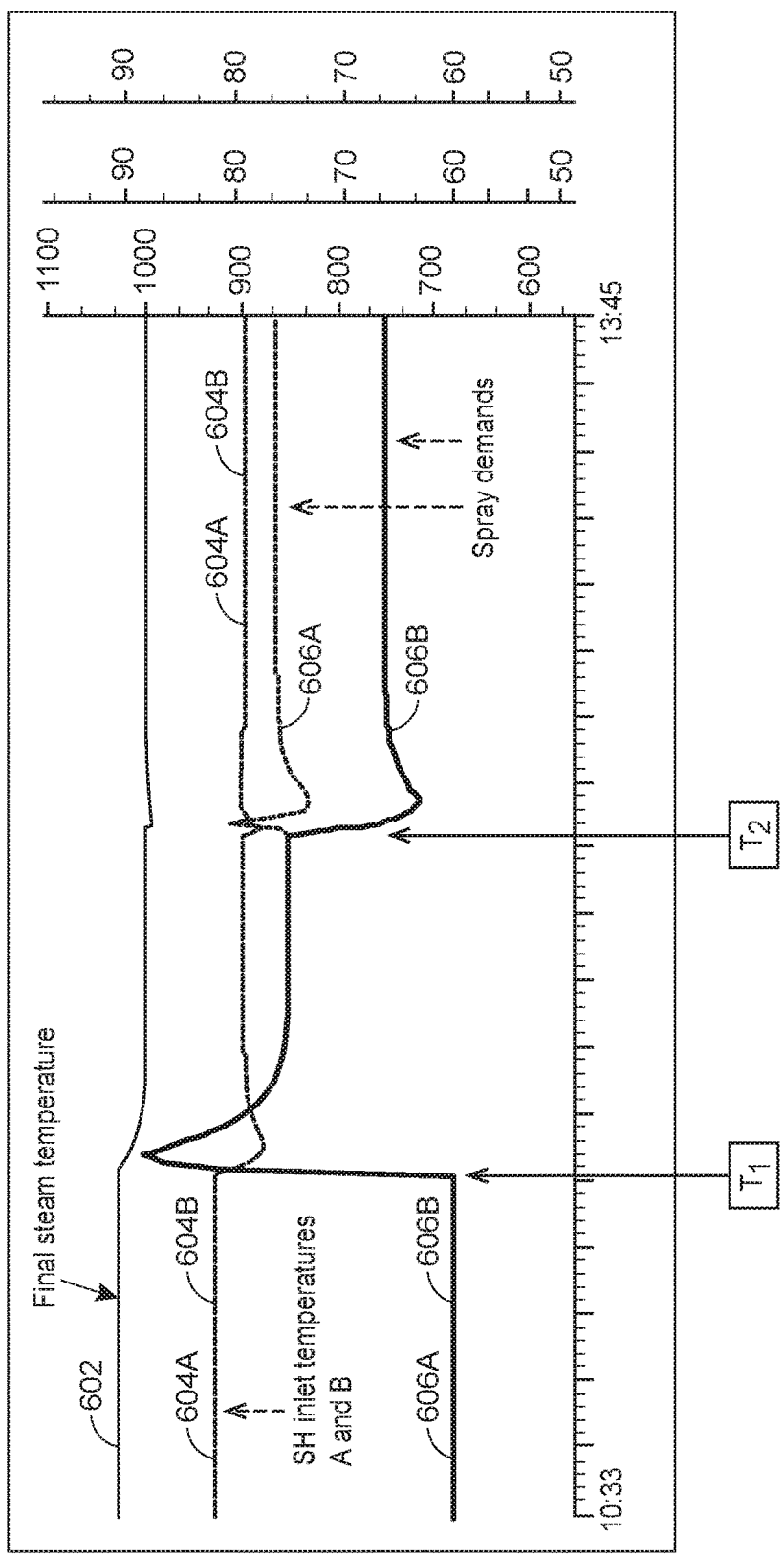
FIG. 6 depicts a chart illustrating simulated control responses of the controller of FIG. 5 in response to a set point change and to an unmeasured disturbance.
Figure 7:
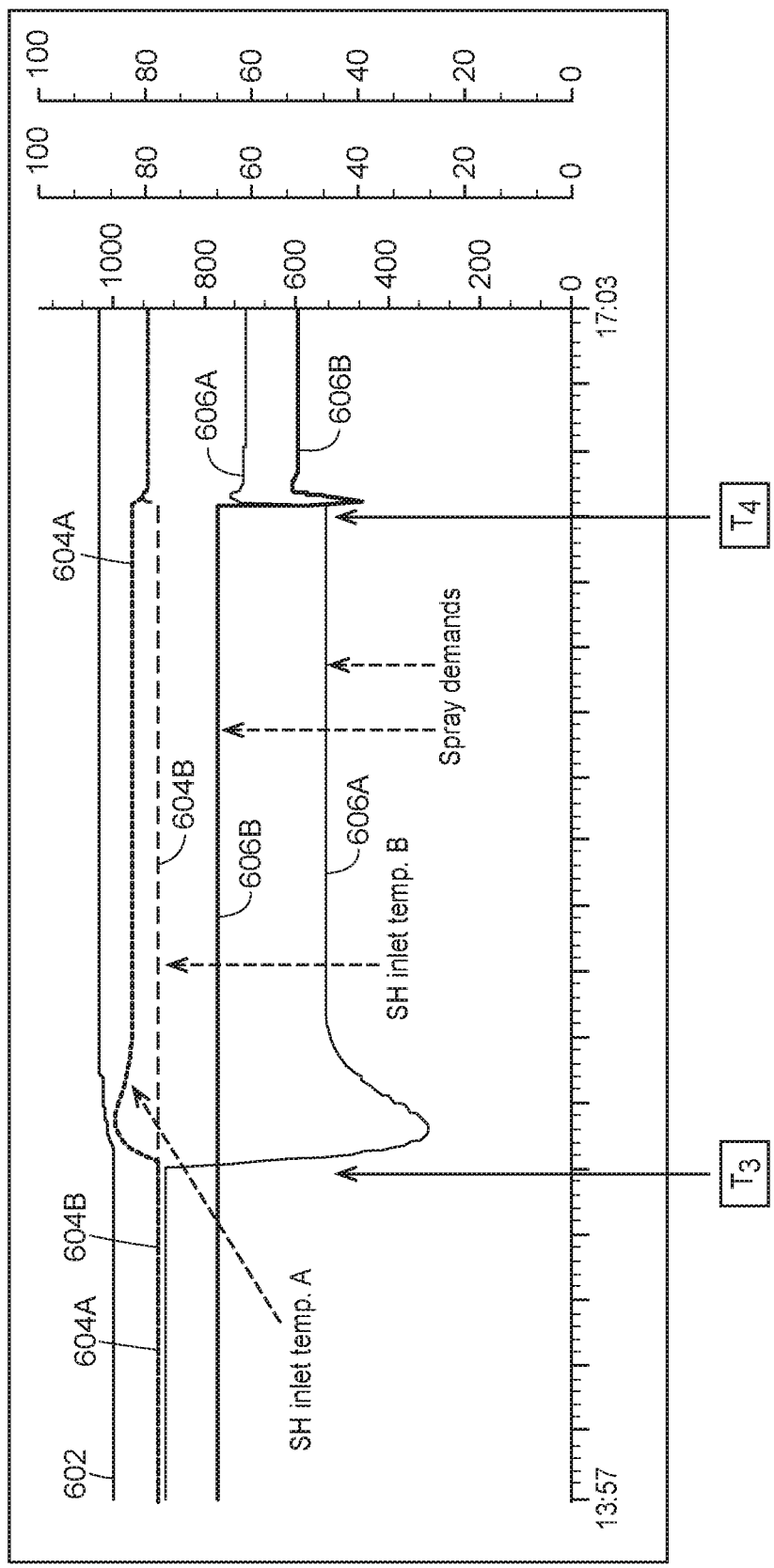
FIG. 7 depicts a chart illustrating simulated control responses of the controller of FIG. 5 in response to one of the spray control values being placed into and out of a manual mode.

FIGS. 6 and 7 depict graphs illustrating a simulated operation of the control scheme of FIG. 5 in a process such as that of FIG. 1 in response to various different changes, such as set point changes, process upsets, and one of the spray valves (16A or 16B) in the separate steam lines being set into and out of a manual mode, to indicate the effectiveness of this control scheme in keeping the final steam temperature $T_{Final}$ at or near the set point $SP_1$ in these various different situations. In particular, FIG. 6 depicts a line 602 that represents the final steam temperature $T_{Final}$ of the system of FIG. 1, lines 604A and 604B that represent the measured temperatures $T_A$ and $T_B$ after the mixing zones 18A and 18B, respectively, in FIG. 1, and lines 606A and 606B that represent the flow of water through (or the positioning of) the control valves 16A and 16B, respectively, of FIG. 1. Thus, the lines 604A and 606A represent process variables in the first split steam line or path (referred to as steam path A) while the lines 604B and 606B represent process variables in the second split steam line or path (referred to as steam path B). Still further, the line 602 represents a process variable in the combined flow path.

Moreover, the control system used in the simulation of FIGS. 6 and 7 was a MIMO (2×2) controller having two control inputs (representing the measured final steam temperature $T_{Final}$ and the difference between temperatures $T_A$ and $T_B$) and two control outputs which controlled the positioning and therefore the flow of cooling liquid (water) through the spray control valves 16A and 16B in the implementation of FIG. 1. The control algorithm was implemented as an MPC algorithm and the steam temperature process models for both the A and B paths were chosen exactly the same. Likewise, as will be noted, the initial condition starts from a steady state in which the final steam temperature $T_{Final}$ is 1030 degrees F. For illustration purpose, control weighting on spray valves 16A and 16B (i.e., in the separate steam paths) are tuned differently. As will be seen in FIG. 6, prior to a first time $T_1$, the final steam temperature $T_{Final}$ is at a steady state (line 602), the temperatures $T_A$ and $T_B$ are equal and at steady state (lines 604A and 604B), and the control valves are set at the same position to control or allow equal flow there-through (lines 606A and 606B).

At the time $T_1$, the final steam temperature set point ($SP_1$ of FIG. 1) is changed from 1030 to 1000, and the controller controls the spray valves 16A and 16B (using the process model) to cause the final steam temperature $T_{Final}$ to drop to this new set-point (line 602) by driving both the A and B side temperatures $T_A$ and $T_B$ to a new level (lines 604A and 604B) while keeping these temperatures the same or equal to one another. Of course, as the process model for each of the spray valves 16A and 16B is the same, the spray valves (lines 606A and 606B) settle out at a new level or position (which is the same in both cases) to maintain the new final steam temperature set point. As can be seen, the control performance in this instance is satisfactory as the final steam temperature 602 is driven quickly to its new set point with no overshoot, while the temperatures $T_A$ and $T_B$ are kept equal to one another.

At a time $T_2$, an artificial bias (e.g., an un-modeled disturbance) is added to the B-side steam temperature, which causes the controller to control the A-side and B-side spray valves 16A and 16B to be at different positions to maintain the final steam temperature $T_{Final}$ at the set point. As a result, the lines 606A and 606B separate and reach different steady state levels to maintain the final steam temperature $T_{Final}$ at the set point while compensating for the disturbance. As can be seen in FIG. 6, after this abrupt upset, the final steam temperature $T_{Final}$ is tightly controlled to the set-point (1000 degrees F.) and the temperatures $T_A$ and $T_B$ on the A and B steam lines are maintained at the same level, which are the two objectives of the controller.

Referring to FIG. 7, which continues at some point after the end point of FIG. 6, the spray valve 16B in the steam path B or B-side is put into a manual mode (keeping the flow the same as it was previously, but not allowing the controller to effect the positioning of this valve). There is no change in the process variables 602, 604 and 606 at this point because the system is in steady state and the controller does not need to compensate for the loss of control of one of the spray valves. However, at a time $T_3$, the final temperature set point $SP_1$ is increased to 1030 degrees F. As expected, only the spray valve 16A on the A-side takes control action and controls the final steam temperature $T_{Final}$ to the new set point. Thus, in this case, the line 606A decreases sharply while the line 606B remains constant (as the spray valve 16B is in a manual mode and is not being affected by the controller). Here, it will be noted that the controller, via the feedback mechanism illustrated in FIG. 5, recognizes the fact that the B-side spray control valve 16B was put into a manual mode and begins weighting the control calculations on the second control objective (i.e., keeping the difference between steam temperatures $T_A$ and $T_B$ at zero) with a zero weighting, to thereby eliminate this objective in the control scheme. In this case, the A-side and B-side steam temperatures $T_A$ and $T_B$ are no longer maintained at the same level, and they separate and eventually settle down at different values as illustrated by the lines 604A and 604B in FIG. 7.

Next, at a time $T_4$, the B-side control valve 16B is put back to an automatic mode in which this valve is again controlled by or responsive to the controller. The controller recognizes this fact based on the feedback tracking network and beings weighting the second control objective ($T_A$−$T_B$=0) with a full weighting (one) causing the controller to implement both control objectives. This control then results in the controller keeping the final temperature $T_{Final}$ at its set point and in the temperatures $T_A$ and $T_B$ being brought back to the same level again (lines 604A and 604B). Coincidentally, the spray valves 16A and 16B do not settle out at the same level due to the continued unmeasured disturbance introduced at time $T_2$ (lines 606A and 606B). As will be noted however, when the control valve 16B is put back into an automatic mode, the controller begins implementing multi-objective control while keeping the final steam temperature $T_{Final}$ at the set point in a satisfactory manner.

Figure 8:
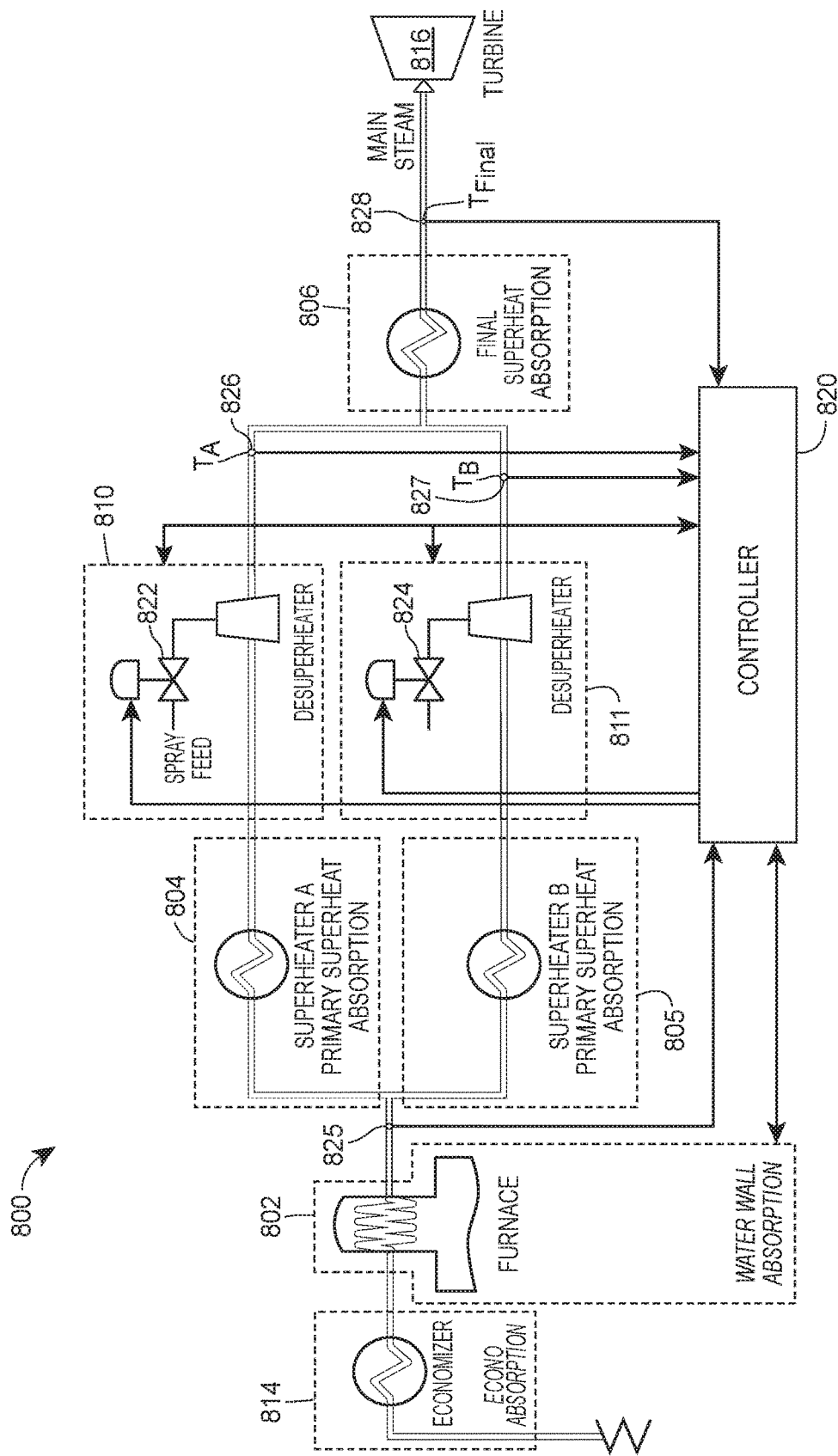
FIG. 8 illustrates a block diagram of a further example of a boiler steam cycle having various superheater sections for use in driving one or more steam powered turbines, the boiler steam cycle having two primary superheaters connected in parallel in split flow paths to a final superheater disposed in a combined flow path, which may be controlled using the control system of FIG. 5.

While the control scheme of FIG. 5 has been described for controlling a split stream power generation system such as that of FIG. 1, this control scheme could be used to control other types of plants or systems including other split stream configurations. For example, FIG. 8 illustrates a block diagram of a once-through boiler steam cycle for a typical boiler 800 that may be used, for example, in a thermal power plant, in which the control system or technique described herein could be used to control a final turbine inlet steam temperature. In particular, the boiler 800 of FIG. 8 may include various sections through which steam or water flows in various forms. The boiler 800 depicts multiple superheater sections through which superheated steam flows, although it should be appreciated that other sections such as a reheater section could also be used. While the boiler 800 illustrated in FIG. 8 has various boiler sections situated horizontally, in an actual implementation, one or more of these sections may be positioned vertically with respect to one another, especially because flue gases heating the steam in various different boiler sections, such as a water wall absorption section, rise vertically (or, spiral vertically).

In any event, as illustrated in FIG. 8, the boiler 800 includes a furnace and a primary water wall absorption section 802, a first primary superheater absorption section 804 in a first split flow path, a second primary superheater absorption section 805 in a second split flow path, and a final superheater absorption section 806 in a combined path. Additionally, the boiler 800 includes a first desuperheater or sprayer section 810 in the first split flow path, a second desuperheater section or sprayer section 811 in the second split flow path, and an economizer section 814. During operation, the main steam generated by the boiler 800 and output by the final superheater absorption section 806 is used to drive a high pressure (HP) turbine 816. In some cases, the boiler 800 may also be used to drive a low or intermediate pressure turbine, such as one included in a reheater absorption section, which is not illustrated in FIG. 8.

The water wall absorption section 802, which is primarily responsible for generating steam, includes a number of pipes through which water or steam from the economizer section 814 is heated in the furnace. Of course, feedwater coming into the water wall absorption section 802 may be pumped through the economizer section 814 and this water absorbs a large amount of heat when in the water wall absorption section 802. The steam or water provided at output of the water wall absorption section 802 is fed to both the first primary superheater absorption section 804 and the second primary superheater absorption section 805.

As illustrated in FIG. 8, the first primary superheater absorption section 804 is connected in parallel with the second primary superheater absorption section 805 (i.e., water flows concurrently through the first primary superheater absorption section 804 and the second primary superheater absorption section 805). Each of the first primary superheater absorption section 804 and the second primary superheater absorption section 805 is configured to heat water entering therein and to output the heated water. Water exiting from both the first primary superheater absorption section 804 and the second primary superheater absorption section 805 is combined in a combined flow path where this water is fed to the final superheater absorption section 806. In particular, water from the first primary superheater absorption section 804 is combined with water from the second primary superheater absorption section 805 before being fed to the final superheater absorption section 806. The use of the first primary superheater absorption section 804, the second primary superheater absorption section 805, and the final superheater absorption section 806 together raise the steam temperature to very high levels. The main steam output from the final superheater absorption section 806 drives the high pressure turbine 816 to generate electricity.

The first sprayer section 810 and the second sprayer section 811 may be used to control the respective temperatures of the steam output from the first primary superheater absorption section 804 and the second primary superheater absorption section 805, and therefore to control the temperature of the steam input into the final superheater absorption section 806 as well as, to a lesser degree, the final steam temperature at the input of the turbine 816. Accordingly, the first sprayer section 810 and the second sprayer section 811 may be controlled to adjust the final steam temperature at the input of the turbine 816 to be at a desired set point using the control system such as that of FIG. 5. For each of the first sprayer section 810 and the second sprayer section 811, a spray feed may be used as a source of water (or other liquid) that is supplied to a valve (illustrated as valves 822 and 824) used to control an amount of spray that is applied to the output steam from the respective sprayer section 810 or 811 and therefore used to adjust the temperature of the output steam. Generally, the more spray that is used (i.e., the more that the valve 822 or 824 is opened), the more the output steam from the respective sprayer section 810 or 811 is cooled or reduced in temperature. In some cases, the spray feed provided to the sprayer sections 810 and 811 can be tapped from the feed line in the economizer section 814.

It should be appreciated that the steam from the turbine 816 may be routed to a reheater absorption section (not illustrated in FIG. 8), and the hot reheated steam that is output from the reheater absorption section can be fed through one or more additional turbine systems (not illustrated in FIG. 8), and/or to a steam condenser (not illustrated in FIG. 8) where the steam is condensed to a liquid form, and the cycle begins again with various boiler feed pumps pumping the feedwater through a cascade of feedwater heater trains and then to the economizer section 814 for the next cycle. The economizer section 814 is located in the flow of hot exhaust gases exiting from the boiler 800 and uses the hot gases to transfer additional heat to the feedwater before the feedwater enters the water wall absorption section 802.

As illustrated in FIG. 8, a controller or controller unit 820 is communicatively coupled to the furnace within the water wall section 802 and to the valves 822 and 824 which respectively control the amount of water provided to sprayers in the first sprayer section 810 and the second sprayer section 811. The controller 820 can also be communicatively coupled to flow sensors (not shown in FIG. 8) disposed at the outputs of the valves 822, 824. The controller 820 is also coupled to various sensors, including an intermediate temperature sensor 825 located at the output of the water wall absorption section 802, multiple primary temperature sensors 826, 827 respectively located at the outputs of the first sprayer section 810 and the second sprayer section 811, and an output temperature sensor 828 located at the output of the final superheater absorption section 806. The controller 820 may also receive other inputs including the firing rate, a load signal (typically referred to as a feed forward signal) which is indicative of and/or a derivative of an actual or desired load of the power plant, as well as signals indicative of settings or features of the boiler including, for example, damper settings, burner tilt positions, etc. The controller 820 may generate and send other control signals to the various boiler and furnace sections of the system and may receive other measurements, such as valve positions, measured spray flows, other temperature measurements, etc. While not specifically illustrated as such in FIG. 8, the controller or controller unit 820 could include separate sections, routines and/or control devices for controlling the superheater section and the optional reheater section of the boiler system. In any event, the controller 820 of FIG. 8 could implement the control technique described with respect to FIG. 5 to perform multi-objective control by simultaneously controlling the final steam temperature $T_{Final}$ of FIG. 8 to be equal to a set point while controlling the intermediate steam temperatures $T_A$ and $T_B$ to be equal to one another when the valves 822 and 824 are in an automatic mode, and controlling only the final steam temperature $T_{Final}$ to the set point when one of the valves 822 and 824 is in a manual mode.

The control schemes, systems, and methods described herein are also applicable to steam generating systems that use other types of split stream configurations for superheater sections than illustrated or described herein. Thus, while FIGS. 1 and 8 illustrate different configurations that use multiple superheater sections, the control scheme described herein may be used with boiler systems having more or less superheater sections, desuperheater sections, etc., and which use any other type of configuration within each of the superheater sections. Moreover, while the control scheme described herein is described with respect to controlling spray valves, this control scheme could be used to control other control means or equipment such as flue gas by-pass dampers, burner tilt positions, etc., in which multiple streams of fluid are controlled separately and are then combined to produce a final process variable being controlled. This control scheme can also be adapted to scenarios where the classical two inter-stage (inner-loop) PID controllers are kept in the control loop.

Moreover, the control schemes, systems, and methods described herein are not limited to controlling only an output steam temperature of a steam generating boiler system. Other dependent process variables of the steam generating boiler system may additionally or alternatively be controlled by the control schemes, systems and methods described herein. For example, the control schemes, systems and methods described herein are applicable to controlling an amount of ammonia for nitrogen oxide reduction, drum levels, furnace pressure, throttle pressure, and other dependent process variables of the steam generating boiler system.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A process control system for controlling a process having two or more split flow paths that converge to form a combined flow path, with one or more control elements disposed in each of the two or more split flow paths for controlling a fluid property within the split flow paths, comprising:

a multivariable controller that includes a plurality of process variable inputs, each process variable input to receive an indication of a determined controlled process variable, a plurality of set point inputs that define a set point for each of the plurality of controlled process variables, a multiplicity of control outputs, each control output to provide a control signal for use in controlling one of the control elements in one of the split flow paths, and a process model that relates changes in each of the control signals to changes in the controlled process variables; and a feedback tracking network that indicates when one of the control elements in one or more of the split flow paths is in a manual mode in which the control element is not responsive to an associated one of the control signals;

wherein, in a first mode, when the feedback tracking network indicates that none of the control elements is in the manual mode, the multivariable controller uses each of the determined controlled process variable indications and the set points for each of the controlled process variables to determine the control signals and, in a second mode, when the feedback tracking network indicates that at least one of the control elements is in the manual mode, the multivariable controller uses less than all of the determined controlled process variable indications and less than all of the associated set points for the controlled process variables to determine the control signals.

2. The process control system of claim 1, wherein a first one of the process variable inputs receives a first process variable indication of a first process variable in the combined flow path and a second one of the process variable inputs receives a second process variable indication related to measurements of a second process variable in each of two or more of the split flow paths.

3. The process control system of claim 2, wherein the second process variable indication is related to a difference between the second process variable in each of two of the split flow paths.

4. The process control system of claim 3, wherein the set point for the second process variable input is zero.

5. The process control system of claim 3, wherein the second process variable in each of the split flow paths is a temperature.

6. The process control system of claim 1, further including a combiner that combines one or more of the control signals with a feed forward control signal to produce an adjusted control signal to be provided to one or more of the control elements in the split flow paths.

7. The process control system of claim 1, further including a module associated with each of the control elements that enables a user to place a respective control element in the manual mode in which the control element is not responsive to one of the control signals.

8. The process control system of claim 1, wherein the controller is coupled to the feedback tracking network to receive an indication of which of the control elements is set in the manual mode, and uses the indication of which of the control elements is set in the manual mode to determine which control signal to use to drive the first controlled process variable to the first set point associated with the first controlled process variable.

9. The process control system of claim 1, wherein the feedback tracking network receives an indication of a manual status of each of the control elements within the split flow paths, and includes a logic element that receives the manual status of each of the control elements within the split flow paths and determines whether any one of the control elements is in the manual mode.

10. The process control system of claim 9, wherein the feedback tracking network includes a switch coupled to the logic element that provides a weighting function to the controller based on the output of the logic element.

11. The process control system of claim 10, wherein the switch provides a weighting function of zero to the controller when the output of the logic element indicates that at least one of the control elements is in the manual mode.

12. The process control system of claim 10, wherein the switch provides a weighting function of one to the controller when the output of the logic element indicates that none of the control elements is in the manual mode.

13. A method of controlling a process having two or more split flow paths that converge to form a combined flow path, with one or more control elements in each of the two or more split flow paths for controlling a fluid property of fluid within the split flow paths, the method comprising:

receiving indications of a first and a second controlled process variable;

receiving set points for each of the first and second controlled process variables;

determining, via a processor, a plurality of control signals, each control signal to be used to control one of the one or more control elements in one of the split flow paths, and receiving a feedback indication of when the control elements in one or more of the split flow paths is in a manual mode in which the control element is not responsive to an associated one of the control signals;

wherein determining the plurality of control signals includes determining the plurality of control signals in a first mode, in which the feedback indication indicates that none of the control elements is in the manual mode, using each of the received first and second controlled process variable indications and the set points for each of the first and second controlled process variables to determine the control signals, and determining the plurality of control signals in a second mode, in which the feedback indication indicates that at least one of the control elements is in the manual mode, using only one of the first and second determined controlled process variable indications and only one of the first and second set points for the controlled process variables.

14. The method of controlling a process of claim 13, wherein determining the plurality of control signals includes implementing, via a processor, a process model that relates changes in each of the control signals to changes in the first and second controlled process variables and further including, in the second mode, weighting calculations related to the effect of the first or second control signal on the first controlled process variable differently than calculations related to the effect of the first or second control signal on the second controlled process variable.

15. The method of controlling a process of claim 14, wherein determining the plurality of control signals includes, in the second mode, weighting the calculations related to the effect of the first or second control signal on the second controlled process variable to zero.

16. The method of controlling a process of claim 13, wherein receiving indications of a first and a second controlled process variable includes receiving an indication of a first process variable within the combined flow path as the first controlled process variable indication and receiving an indication of a second process variable related to measurements of a second process variable in each of two or more of the split flow paths as the second controlled process variable.

17. The method of controlling a process of claim 16, wherein the second process variable indication is related to a difference between the measurements of the second process variable in two of the split flow paths.

18. The method of controlling a process of claim 13, wherein receiving the set point for the second process variable includes receiving a zero set point.

19. The method of controlling a process of claim 13, wherein receiving the second process variable indication includes receiving a measurement of a temperature in each of the split flow paths.

20. The method of controlling a process of claim 19, wherein receiving the second process variable indication includes calculating a difference between the received measurements of temperature in each of the split flow paths.

21. The method of controlling a process of claim 13, wherein receiving the second process variable indication includes receiving a measurement of a particular process variable from two of the split flow paths and calculating a difference between the measurement of the particular process variable from the two of the split flow paths.

22. The method of controlling a process of claim 13, wherein determining the plurality of control signals in the second mode further includes determining, via a processor, which of the control signals to use to drive the first controlled process variable to the first set point associated with the first controlled process variable based on an indication of which of the control elements is set in the manual mode.

23. A process control system for controlling a process having two or more split flow paths that converge to form a combined flow path, with one or more control elements in each of the two or more split flow paths for controlling a fluid property within the split flow paths, comprising:
  a multivariable controller that includes a plurality of controlled variable inputs, which each receives a value of a different controlled variable, and a set point input for each of the plurality of controlled variables associated with the controlled variable inputs, wherein the multivariable controller operates via a processor to simultaneously determine a multiplicity of control signals with each control signal for use in controlling one of the control elements in one of the split flow paths, wherein the multivariable controller determines the values of the multiplicity of control signals to implement two or more objectives, the first objective being to drive a first controlled variable to the set point for the first controlled variable and the second objective being to drive a second controlled variable to the set point for the second controlled variable; and
  a feedback tracking network that indicates when the control elements in one or more of the split flow paths is in a manual mode in which the control element is not responsive to an associated one of the control signals;
  wherein, in a first mode, when the feedback tracking network indicates that none of the control elements is in the manual mode, the multivariable controller determines the control signals to implement both of the first and second objectives and, in a second mode, when the feedback tracking network indicates that at least one of the control elements is in the manual mode, the multivariable controller determines the control signals to implement only one of the first and second objectives.

24. The process control system of claim 23, wherein the first controlled variable is a process variable in the combined flow path and the second controlled variable is a variable related to measurements of a particular process variable in each of two or more of the split flow paths.

25. The process control system of claim 24, wherein the second controlled variable is a difference between the measurements of the particular process variable from two of the split flow paths.

26. The process control system of claim 25, wherein the set point for the second controlled variable is zero such that the second objective is to drive the particular process variable in the two of the split flow paths to the same value.

27. The process control system of claim 26, wherein, in a second mode, the multivariable controller determines the control signals to implement only the first objective.

28. The process control system of claim 22, further including a module associated with each of the control elements that enables a user to place a respective control element in the manual mode in which the control element is not responsive to one of the control signals.

29. The process control system of claim 22, wherein the multivariable controller is coupled to the feedback tracking network to receive an indication of which of the control elements is set in the manual mode, and, in the second mode, uses the indication of which of the control elements is set in the manual mode to determine which control signal to use to drive the first controlled variable to the first set point associated with the first controlled variable.

30. The process control system of claim 22, wherein the feedback tracking network receives an indication of a manual status of each of the control elements within the split flow paths, and includes a logic element the receives the manual status of each of the control elements within the split flow paths and determines whether any one of the control elements in the split flow paths is in a manual mode, and wherein the feedback tracking network includes a switch coupled to the logic element that provides a weighting function to the controller based on the output of the logic element.

31. A method of controlling a process having two or more split flow paths that converge to form a combined flow path and including one or more control elements in each of the two or more split flow paths for controlling a fluid property of fluid within the split flow paths, comprising:
  receiving indications of a multiplicity of controlled variables;
  storing set points for each of the multiplicity of controlled variables;
  determining, via a processor, a plurality of control signals, each control signal to be used to control one of the one or more control elements in one of the split flow paths, including, determining the values of the multiplicity of control signals to implement a multiplicity of objectives, each objective related to driving an associated one of the controlled variables to the set point for the associated one of the controlled variables, and
  receiving a feedback indication of when the control element in one or more of the split flow paths is in a manual mode in which the control element is not responsive to an associated one of the control signals;
  wherein, in a first mode when the feedback indication indicates that none of the control elements is in the manual mode, determining the plurality of control signals includes determining values for the control signals that implement all of the multiplicity of objectives and, in a second mode when the feedback indication indicates that at least one of the control elements is in the manual mode, determining the plurality of control signals includes determining values for the control signals that implement less than all of the multiplicity of objectives.

32. The method of controlling a process of claim 31, wherein a first one of the controlled variables is a process variable related to the fluid in the combined flow path and a second one of the controlled variables is a process variable related to measurements of a particular process variable in each of two or more of the split flow paths.

33. The method of controlling a process of claim 32, wherein the second one of the controlled variables is a difference between the values of the particular process variable as determined in each of two of the split flow paths.

34. The method of controlling a process of claim 33, wherein, in the first mode, determining the control signals includes determining values of the control signals that drive the values of the particular process variable in each of the two split flow paths to the same value.

35. The method of controlling a process of claim 31, further including collecting indications of whether one or more of the control elements is in the manual mode and using the collected indications to determine a weighting factor to use to generate the control signals.

36. The method of controlling a process of claim 35, further including determining a weighting factor of zero to apply to control calculations used to generate the control signals related to implementing one of the objectives in the second mode.

37. The method of controlling a process of claim 31, wherein determining a plurality of control signals includes using, via a processor, a process model that relates changes in each of the control signals to changes in the controlled variables to simultaneously determine the control signals to implement one or more of the objectives.

38. The method of controlling a process of claim 31, further including, in the second mode, determining which of the control elements is in the manual mode and determining which control signal to use to drive the one of the controlled variables to the associated controlled variable set point based on which of the control elements is in the manual mode.

39. A process control system for use in controlling a first fluid property of a fluid in a combined flow path of a process having two or more split flow paths that converge to form the combined flow path, comprising:
a control element in each of the two or more split flow paths for controlling a particular fluid property within each of the split flow paths;
a first sensor element that determines the first fluid property of the fluid in the combined flow path;
a set of second sensor elements that determine a particular fluid property of the fluid within each of the split flow paths;
a multivariable controller coupled to the first sensor element and to the set of second sensor elements to receive values of a first controlled variable and a second controlled variable, that receives values of a first set point for the first controlled variable and a second set point for the second controlled variable, that includes a process model that relates changes in each of the control signals to changes in the controlled variables, and that uses the process model to simultaneously determine a plurality of control signals for controlling the control elements in the split flow paths based on the received values of the first and second controlled variables and based on the values of the first and second set points; and
a manual mode block associated with each of the control elements that enables a user to place an associated control element in a manual mode in which the control element is not responsive to an associated one of the control signals, and further including a feedback tracking network that indicates when the control element in one or more of the split flow paths is in a manual mode, wherein the multivariable controller operates in a first mode when the feedback tracking network indicates that none of the control elements is in the manual mode to drive both the first controlled variable to the set point for the first controlled variable and the second controlled variable to the set point for the second controlled variable, and operates in a second mode when the feedback tracking network indicates that at least one of the control elements is in the manual mode to drive the first controlled variable to the set point for the first controlled variable without driving the second controlled variable to the set point for the second controlled variable.

40. The process control system of claim 39, wherein the multivariable controller operates in the first mode to apply a first weighting factor to control signal calculations associated with driving the second controlled variable to the set point for the second controlled variable and operates in the second mode to apply a second weighting factor to the control signal calculations associated with driving the second controlled variable to the set point for the second controlled variable, wherein the second weighting function is different than the first weighting function.

41. The process control system of claim 40, wherein the second weighting factor is zero.

42. The process control system of claim 39, wherein the second controlled variable is combination of measurement values of the set of second sensor elements that determine the particular fluid property of the fluid within each of the split flow paths.

43. The process control system of claim 39, wherein the second controlled variable is a difference between measurement values of the particular fluid property of the fluid within two of the split flow paths.

44. The process control system of claim 43, wherein the set point for the second controlled variable is zero.

45. The process control system of claim 39, wherein the multivariable controller stores the set point for the second controlled variable.

46. The process control system of claim 39, wherein the first fluid property is a temperature and the first controlled variable is the first fluid property.

47. The process control system of claim 46, wherein the particular fluid property is a temperature and the second controlled variable is a difference between the temperatures of the fluids in two of the split flow paths.

48. The process control system of claim 39, wherein the multivariable controller is a model predictive controller.

49. The process control system of claim 39, wherein the multivariable controller is process model based and the process model is a set of first principle equations.

* * * * *